US012331577B2

(12) United States Patent
Mastros et al.

(10) Patent No.: US 12,331,577 B2
(45) **Date of Patent: *Jun. 17, 2025**

(54) MOVABLE BARRIER OPERATOR

(71) Applicant: The Chamberlain Group LLC, Oak Brook, IL (US)

(72) Inventors: Brian Phillip Mastros, Carol Stream, IL (US); David R. Morris, Glenview, IL (US); Brian Roy Skotty, Elmhurst, IL (US); Zoltan Sostarecz, Melrose Park, IL (US)

(73) Assignee: THE CHAMBERLAIN GROUP LLC., Oak Brook, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/233,479

(22) Filed: Aug. 14, 2023

(65) Prior Publication Data

US 2024/0044197 A1 Feb. 8, 2024

Related U.S. Application Data

(63) Continuation of application No. 17/275,098, filed as application No. PCT/US2019/049265 on Sep. 3, 2019, now Pat. No. 11,773,638.

(Continued)

(51) Int. Cl.
*E05F 15/00* (2015.01)
*E05F 15/668* (2015.01)

(52) U.S. Cl.
CPC ....... *E05F 15/668* (2015.01); *E05Y 2201/434* (2013.01); *E05Y 2201/652* (2013.01);

(Continued)

(58) Field of Classification Search
CPC .. E05F 15/668; E05F 15/697; E05Y 2201/43; E05Y 2201/434; E05Y 2201/652;

(Continued)

(56) References Cited

U.S. PATENT DOCUMENTS 4,520,591 A 6/1985 Calvagno
5,010,688 A 4/1991 Dombrowski et al.

(Continued)

FOREIGN PATENT DOCUMENTS

WO 02099235 12/2002
WO 2018217332 11/2018

OTHER PUBLICATIONS

PCT/US2019/049265; International Search Report dated Jan. 23, 2020; 5 pages.

(Continued)

*Primary Examiner* — Chi Q Nguyen
(74) *Attorney, Agent, or Firm* — Dority & Manning, P.A.

(57) ABSTRACT

In accordance with one aspect of the present disclosure, a movable barrier operator including a body, a motor supported by the body, and a rotatable drive supported by the body and configured to be connected to an elongated driven member. The movable barrier operator further includes a shaft supported by the body and a compound gear mounted on the shaft. The compound gear includes a first gear operably coupled to a drive shaft of the motor and a second gear operably coupled to the rotatable drive. The first and second gears connected such that turning of the first gear causes turning of the second gear.

14 Claims, 29 Drawing Sheets

Related U.S. Application Data

(60) Provisional application No. 62/730,303, filed on Sep. 12, 2018.

(52) U.S. Cl.
CPC ... *E05Y 2201/656* (2013.01); *E05Y 2201/702* (2013.01); *E05Y 2201/704* (2013.01); *E05Y 2201/716* (2013.01); *E05Y 2900/106* (2013.01)

(58) Field of Classification Search
CPC ......... E05Y 2201/704; E05Y 2201/656; E05Y 2201/702; E05Y 2201/71; E05Y 2201/72; E05Y 2201/716; E05Y 2900/106
See application file for complete search history.

(56) References Cited

U.S. PATENT DOCUMENTS

| | | | | | |
|---|---|---|---|---|---|
| 5,557,887 | A | 9/1996 | Fellows | | |
| 5,927,690 | A | 7/1999 | White et al. | | |
| 6,422,965 | B1 | 7/2002 | Balli | | |
| 6,739,372 | B2 | 5/2004 | Mullet | | |
| 6,880,609 | B2 | 4/2005 | Mullet | | |
| 7,207,142 | B2 | 4/2007 | Mullet | | |
| 8,033,374 | B2 | 10/2011 | Gunton | | |
| 8,896,435 | B2 * | 11/2014 | Philip | H04W 4/90 | 340/5.2 |
| 9,234,377 | B2 | 1/2016 | Schatz | | |
| 10,000,960 | B2 * | 6/2018 | Angiuli | E05F 15/40 | |
| 10,718,149 | B2 | 7/2020 | Liu | | |
| 11,111,714 | B2 * | 9/2021 | Baer | E05F 15/77 | |
| 11,428,038 | B2 | 8/2022 | Skotty | | |
| 11,441,347 | B2 | 9/2022 | Hall | | |
| 11,773,638 | B2 | 10/2023 | Mastros | | |
| 12,064,988 | B1 * | 8/2024 | He | B43K 23/06 | |
| 2005/0156546 | A1 | 7/2005 | Keller | | |
| 2005/0235563 | A1 * | 10/2005 | Mullet | E05F 15/686 | 49/200 |
| 2007/0215292 | A1 * | 9/2007 | Mullet | E05D 13/1261 | 160/189 |
| 2009/0256440 | A1 | 10/2009 | Kragh | | |
| 2014/0223825 | A1 | 8/2014 | Murray | | |
| 2015/0151664 | A1 | 6/2015 | Chang | | |
| 2015/0315793 | A1 * | 11/2015 | Deutsch | E05F 1/1091 | 49/324 |
| 2020/0018110 | A1 | 1/2020 | Lindley | | |
| 2021/0032921 | A1 | 2/2021 | Skotty | | |
| 2021/0104239 | A1 | 4/2021 | Miyazaki | | |
| 2021/0270078 | A1 * | 9/2021 | Hall | E05F 15/684 | |
| 2021/0396059 | A1 | 12/2021 | Hall | | |
| 2022/0056751 | A1 | 2/2022 | Mastros | | |
| 2022/0228418 | A1 * | 7/2022 | Hall | E05F 15/684 | |
| 2023/0265704 | A1 * | 8/2023 | Zeabari | E05F 15/48 | 74/89.38 |
| 2024/0183210 | A1 * | 6/2024 | Thouin | E05F 17/00 | |

OTHER PUBLICATIONS

PCT/US2019/049265; Written Opinion of the International Searching Authority dated Jan. 23, 2020; 6 pages.
The Chamberlain Group, Liftmaster Chain Drive Garage Door Opener, Model 8360, copyright 2011, 40 pages.
The Chamberlain Group, Liftmaster Premium Series Belt Drive Garage Door Opener, Model 8355, copyright 2012, 76 pages.

* cited by examiner

MOVABLE BARRIER OPERATOR

CROSS-REFERENCE TO RELATED APPLICATIONS

This application is a continuation of U.S. patent application Ser. No. 17/275,098, filed Mar. 10, 2021, entitled MOVABLE BARRIER OPERATOR, now issued as U.S. Pat. No. 11,773,638, which is a U.S. national phase application of PCT/US2019/049265, filed Sep. 3, 2019, designating the United States, which claims the benefit of U.S. Provisional Patent App. No. 62/730,303, filed Sep. 12, 2018, which are all hereby incorporated by reference herein in their entireties.

FIELD

The field of this disclosure relates to movable barriers and, more specifically, to movable barrier operators for moving movable barriers.

BACKGROUND

Various types of movable barrier operators are known for controlling the position of movable barriers. For example, movable barrier operators may include swinging gate operators, jackshaft operators, and others. One type of movable barrier operator utilizes a head unit to move a trolley along a rail. The trolley is in turn connected to a segmented door to translate movement of the trolley into movement of the segmented door. These types of operators are commonly located in a garage of a household to move a garage door between open and closed positions. The head unit has a motor with a shaft that drives a transmission having an output such as a drive sprocket engaged with a chain. The chain is connected to the trolley so that rotation of the drive sprocket causes movement of the trolley relative to the rail.

The path of the garage door is preferably free of obstacles that could interfere with movement of the garage door between closed and open positions. However, an object may enter the path of the garage door such as a shelf installed by a homeowner in the garage. Garage doors may be heavy, such as garage doors made of wood, and may be several hundred pounds. If the garage door is traveling at full speed from the closed position toward the open position and impacts the shelf, the garage door may be brought to a sudden stop while the motor of the head unit continues to try to drive the garage door to the open position. The jarring impact of the garage door may break the motor or a transmission component of the head unit. The drive sprocket could then rotate freely and the garage door may be free to travel back toward its closed position and may damage the garage floor and/or the garage door.

Some garage door opener systems are provided to an installer with a rail having a predetermined length. The rail is packaged with the associated components, such as a chain, the gears for driving and guiding the chain along the rail, and hardware for installing the rail. The rail is packaged in a cardboard box with the components packaged in plastic bags. The cardboard box provides protection for the rail since the rail may be provided in an assembly of rails that are moved about by forklift trucks in warehouses during manufacture and shipping. One problem with the use of a cardboard box and plastic bands is the potential waste associated with disposing of the cardboard box and plastic bags. Another problem with the cardboard box/plastic bag approach is that an installer has to open the cardboard box and plastic bags and keep track of the components while the installer installs the rail.

SUMMARY

In accordance with one aspect of the present disclosure, a movable barrier operator is provided that includes a body, a motor supported by the body, and a rotatable drive supported by the body and configured to be connected to an elongate driven member. The movable barrier operator further includes a lockable transmission connecting the motor and the rotatable drive. The lockable transmission has an unlocked configuration that permits the rotatable drive to rotate relative to the body to drive the driven member and a locked configuration that secures the rotatable drive against rotation relative to the body. The lockable transmission also has a locked configuration that fixes the rotatable drive against rotation relative to the body. The lockable transmission is configured to shift from the unlocked configuration to the locked configuration in response to a torque applied to the rotatable drive exceeding a predetermined threshold. In this manner, the lockable transmission provides a safety mechanism to inhibit rotation of the rotatable drive if there is a significant torque applied to the rotatable drive, such as the associated movable barrier impacting a shelf or other object. Inhibiting rotation of the rotatable drive allows the movable barrier operator to prevent uncontrolled movement of the movable barrier post-impact.

In another aspect, a method is provided for operating a movable barrier operator. The method includes rotating a rotatable drive of the movable barrier operator to drive an elongate, flexible member and move a movable barrier connected to the flexible member. The method further includes receiving a torque at a rotatable drive of the movable barrier operator that exceeds a predetermined threshold torque. The method also includes locking a transmission of the movable barrier operator in response to receiving the torque at the rotatable drive thereof to secure the rotatable drive to a body of the movable barrier operator and fix the rotatable drive against rotation relative to the body. By fixing the rotatable drive against rotation relative to the body of the movable barrier operator, the movable barrier may be held in position against unintentional movement despite a large impact that may have damaged the movable barrier operator.

A movable barrier operator is also provided that includes a body, a motor supported by the body and having a rotatable drive shaft, and a rotatable drive supported by the body and configured to be connected to an elongate driven member. The movable barrier operator includes a shaft supported by the body and a compound gear mounted on the shaft. The compound gear includes a first gear operably coupled to the motor drive shaft and a second gear operably coupled to the rotatable drive, the first and second gears connected such that turning of the first gear causes turning of the second gear. The first and second gears may have different sizes and different numbers of teeth to provide a desired gear ratio and a desired speed of a movable barrier operator. This permits the manufacturer, installer, or repairer of the movable barrier operator to select the speed (or speeds) the movable barrier operator moves the associated movable barrier by utilizing a compound gear with a particular gear ratio. Further, the compound gear permits the first and second gears to be made of different materials so that each gear may provide different operability in use.

In one embodiment, the compound gear assembly includes a plurality of raised ridges that each include a pair of ramp portions. The compound gear assembly further includes a plurality of recesses that receive the raised ridges and a pair of walls associated with each recess. One of the ramp portions of each of the raised ridges is configured to cammingly engage one of the pair of walls with turning of the second gear relative to the first gear caused by a torque applied to the rotatable drive. The camming engagement causes one of the first and second gears to shift along the shaft away from the other of the first and second gears. This shifting decouples the first and second gears and permits one of the gears to turn freely relative to the other gear.

In accordance with another aspect of the present disclosure, an end cap is provided for a rail of a movable barrier operator. The end cap includes a first body, a second body, and a primary compartment formed by the first body and the second body. The compartment is configured to receive an end of a rail of a movable barrier operator. The end cap further includes at least one secondary compartment of the first body or the second body configured to receive hardware for installing the rail. The end cap protects the end of the rail during transit and, during installation, provides a convenient and organized storage system for hardware an installer will use to install the rail.

The present disclosure also provides a trolley for a garage door opener system. The trolley includes a body configured to be connected to an elongated rail of a garage door opener system and to be shifted longitudinally therealong. The body has a receiving portion configured to receive a trolley connector of an elongated drive member. The elongated drive member may include, for example, a belt or a chain. The trolley further includes a flexible actuator extending laterally outward and downward from the body, and a hammer pivotally connected to the body about a longitudinal pivot axis. The hammer is connected to the flexible actuator and is configured to pivot in response to downward movement of the flexible actuator, wherein the hammer pivots from an engaged position in which the hammer secures the trolley connector relative to the body, to a release position in which the hammer is spaced from the trolley connector and permits the trolley connector to shift relative to the body. In attempts to gain unauthorized entry to garages, intruders have been known to insert a coat hanger between the garage door and the header above the garage door to try to pull the emergency release handle of conventional garage door opener trolleys in a longitudinal direction generally along the rail of the garage door opener (toward the door) to thereby disengage the trolley and garage door from the chain or belt of the garage door opener. However, the hammer of the trolley disclosed herein is pivotally connected to the body about a longitudinal axis and the flexible actuator extends laterally outward and downward from the body. An intruder's attempt to pull the flexible actuator longitudinally toward the garage door using a coat hanger would be unlikely to pivot the hammer to the release position because the pull force would be directed generally parallel to the pivot axis of the hammer. The garage door opener system incorporating the trolley is therefore more secure against unauthorized entry into the garage.

DETAILED DESCRIPTION

Figure 1:
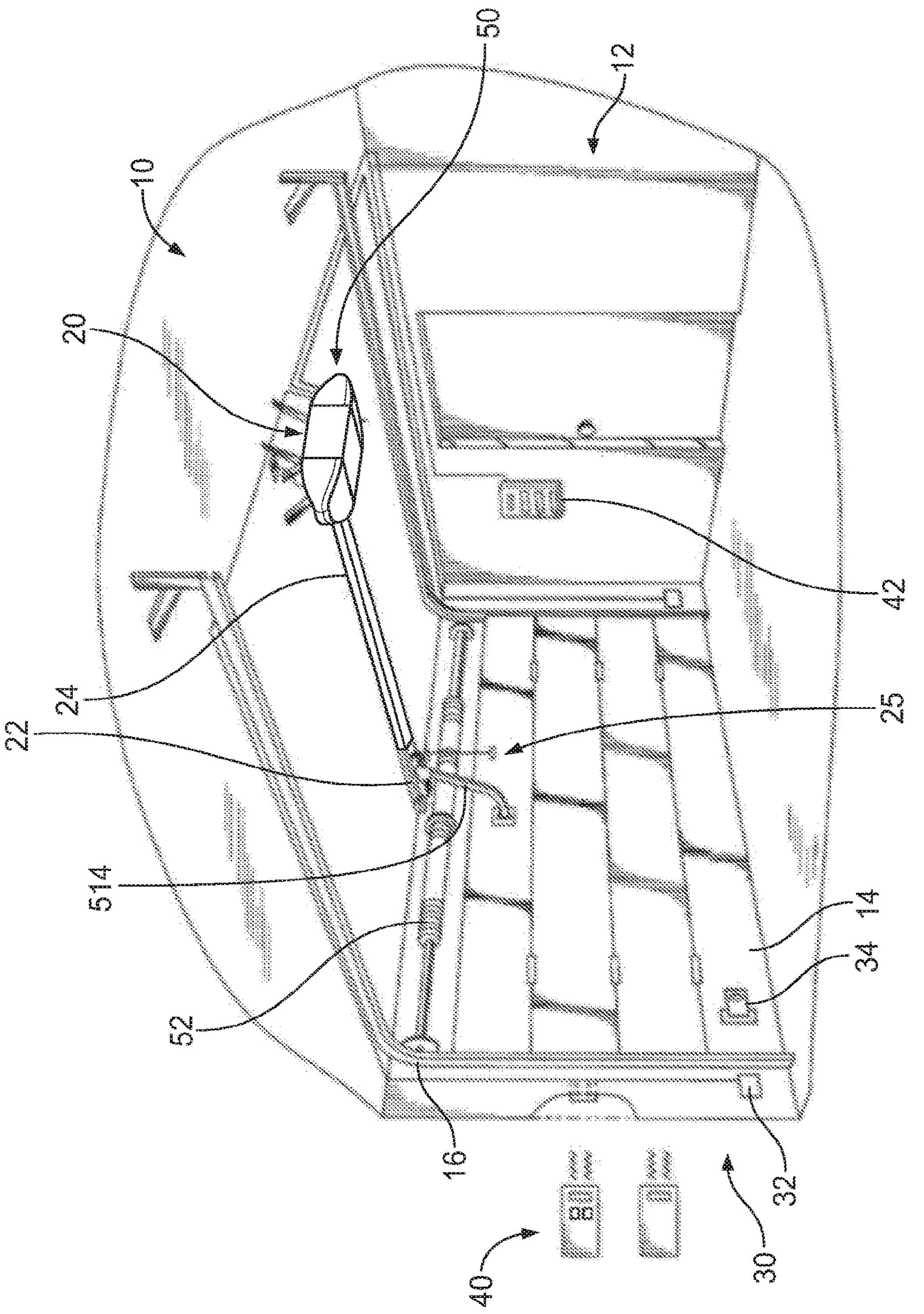
FIG. 1 is a perspective view of a movable barrier operator system installed in a garage, the movable barrier operator system including a head unit mounted to a ceiling of the garage.

With reference to FIG. 1, a movable barrier operator system 10 is installed in a secured area such as a garage 12. The movable barrier operator system 10 controls the position of a movable barrier, such as a segmented garage door 14. The garage door 14 includes wheels received in tracks 16 that guide the garage door 14 from a lower, closed position to an upper, open position. The movable barrier operator system includes one or more counterbalance torsion springs 52 that assist in moving the garage door 14. The movable barrier operator system 10 includes a movable barrier operator, such as a head unit 20, operable to drive a trolley 22 along a rail 24. The trolley 22 is connected to the head unit 20 by an elongate driven member, such as a belt or chain 26 (see FIG. 34). The movable barrier operator system 10 of FIG. 1 includes a release mechanism 25 configured to disengage the trolley 22 from the chain 26 to thereby permit the garage door 14 to move independently of the head unit 20. The movable barrier operator system 10 includes one or more sensors 30, such as an obstacle detector 32 and a door position sensor 34. The obstacle detector 32 may be connected by wired or wireless approaches to the head unit 20 to detect whether there is an object in the path of the garage door 14. The door position sensor 34 detects whether the garage door 14 is in a closed position, an open position, or moving between the open and closed positions. The movable barrier operator system 10 includes one or more remote controls, such as radio frequency transmitters 40 and a wall-mounted switch 42.

Figure 2:
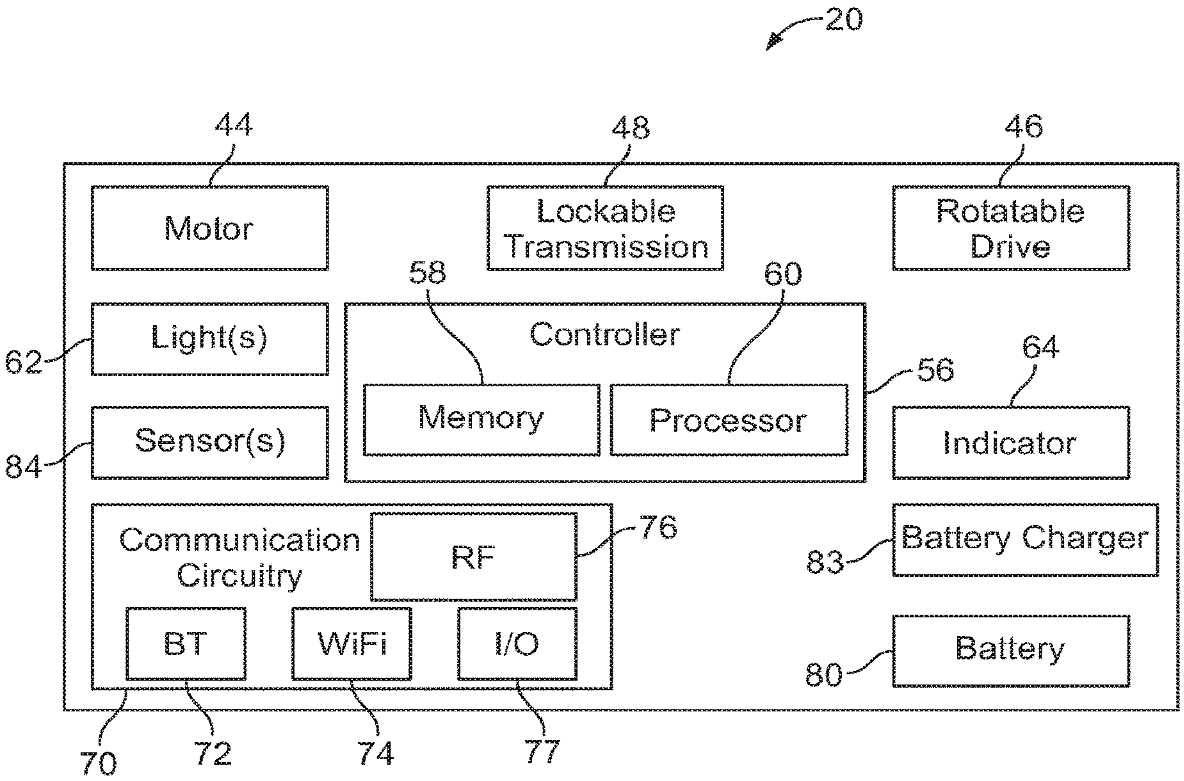
FIG. 2 is a schematic representation of the head unit of the movable barrier operator system of FIG. 1.

With reference to FIG. 2, the head unit 20 includes a motor 44 that causes rotation of a rotatable drive 46 (see FIG. 13) via a lockable transmission 48 connecting the motor 44 and the rotatable drive 46. As discussed in greater detail below, the lockable transmission 48 has an unlocked configuration that permits the rotatable drive 46 to turn relative to a body 50 (see FIG. 1) of the head unit 20 and a locked configuration that secures the rotatable drive 46 to the body 50 and inhibits turning of the rotatable drive 46 relative to the body 50. The lockable transmission 48 shifts from the unlocked configuration to the locked configuration in response to a torque applied to the rotatable drive 46 exceeding a predetermined threshold. In one embodiment, the lockable transmission 48 shifts from the unlocked configuration to the locked configuration when a torque is applied to the rotatable drive 46 which causes the rotatable drive 46 to apply a torque to a spur gear 228 (see FIGS. 14 and 18) of the lockable transmission 48 in the range of approximately 80 N·m to approximately 110 N·m, such as approximately 96 N·m.

For example, when the garage door 14 is closed, a user may install a shelf or other structure or object in the garage 12 too close to a path of the garage door 14. When the user causes the head unit 20 to open the garage door 14, the garage door 14 may contact the shelf or structure/object when the garage door is traveling at full speed such that the garage door may be suddenly stopped. The jarring impact of the garage door 14 stopping while at full speed causes the lockable transmission 48 to shift from the unlocked configuration to the locked configuration to thereby fix the rotatable drive 46 against rotation relative to the body 50. Because the rotatable drive 46 is fixed, the rotatable drive 46 resists movement of the chain 26 and keeps the garage door 14 from moving downward without control by the motor 44. In one embodiment, the lockable transmission 48 is internal to the head unit 20 and provides an efficient, space-saving safety mechanism for the movable barrier operator system 10.

Regarding FIG. 2, the head unit 20 includes a controller 56 that controls operation of the motor 44 and includes a memory 58 and a processor 60. Memory 58 may include or may be a non-transitory computer readable medium comprising instructions that when performed by the processor 60 cause operation of the motor 44 and/or other components of the head unit 20. The head unit 20 includes one or more lights 62 for illuminating the garage 12. The head unit 20 includes one or more indicators 64 for making indications to a person in the garage 12. The one or more indicators 64 may be a speaker and/or a laser identifying a location for parking, or a user interface configured to display faults, error codes, or maintenance reminders as some examples.

The head unit 20 further includes communication circuitry 70 for communicating with other devices and users of the movable barrier operator system 10. For example, the communication circuitry 70 may include a short-range (e.g. Bluetooth) transceiver 72, a medium-range (e.g. Wi-Fi) transceiver 74, a long-range radio frequency (e.g. cellular) transmitter or transceiver 76, and an input-output module 77. The input-output module 77 may receive electrical signals from the wall-mounted switch 42 as well as the obstacle detectors 32. The head unit 20 further includes a removable battery 80 and a battery charger 83. The head unit 20 includes a power cord 82 (see FIG. 3) for connecting to an AC electrical socket. The battery 80 may be used to power the head unit 20 when there is an AC power outage. Regarding FIGS. 2 and 3, the head unit 20 includes one or more on-board sensors 84, such as one or more rotary encoders 86 and a motion sensor for detecting movement in the garage 12.

Figure 3:
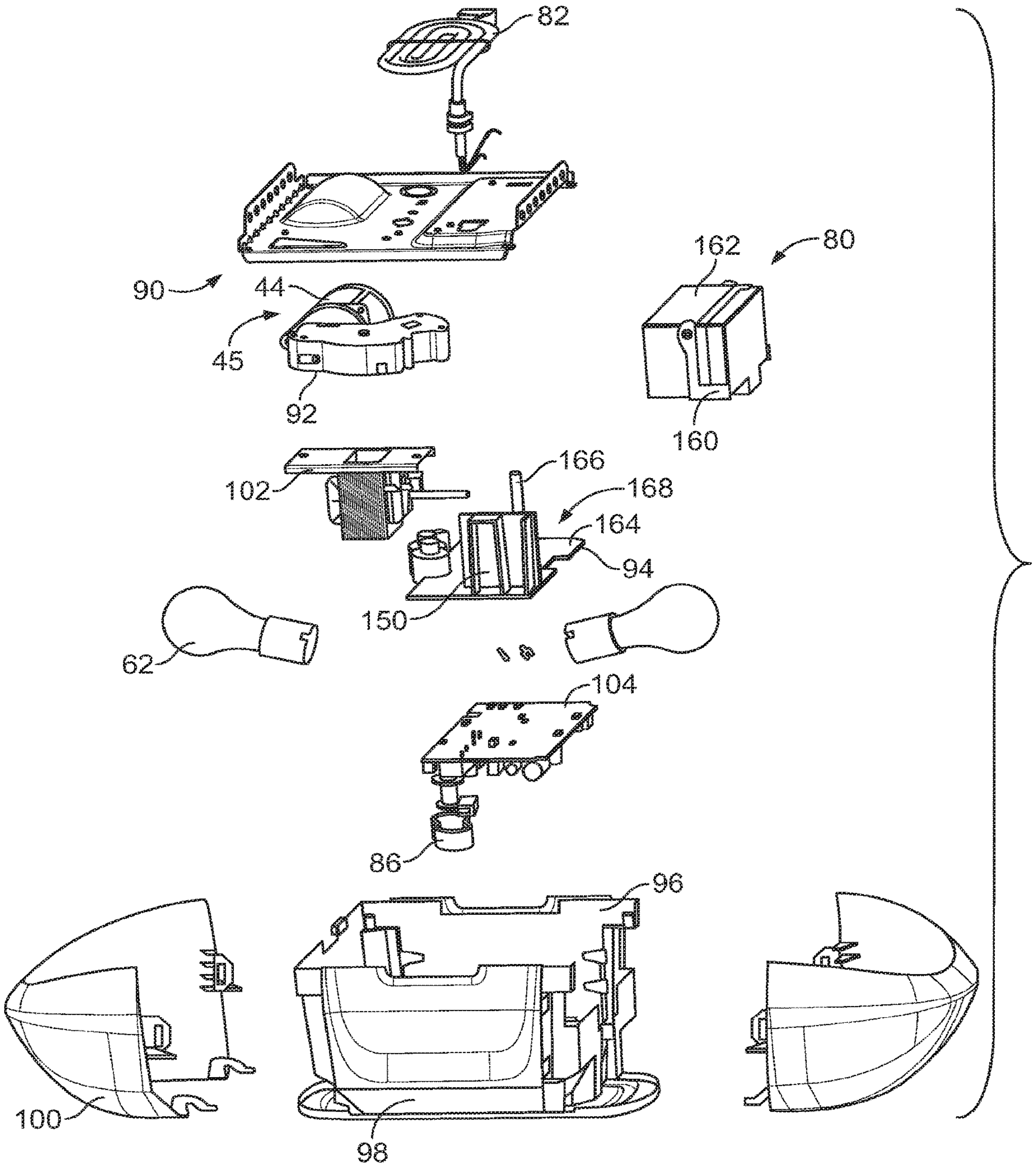
FIG. 3 is an exploded view of the head unit of FIG. 1.

With reference to FIG. 3, the body 50 includes a chassis 90, a transmission 92 mounted to the chassis 90, a printed circuit board (PCB) support 94 mounted to the chassis and an outer housing 96 releasably mounted to the chassis 90. The outer housing 96 has connected thereto a shell 98 and transparent or translucent light covers 100. The shell 98 may be a different color than the outer housing 96 and contribute to the overall appearance of the head unit 20. To move the garage door 14, the head unit 20 includes a motor assembly 45 which includes the motor 44 and the transmission 92.

Figure 4:
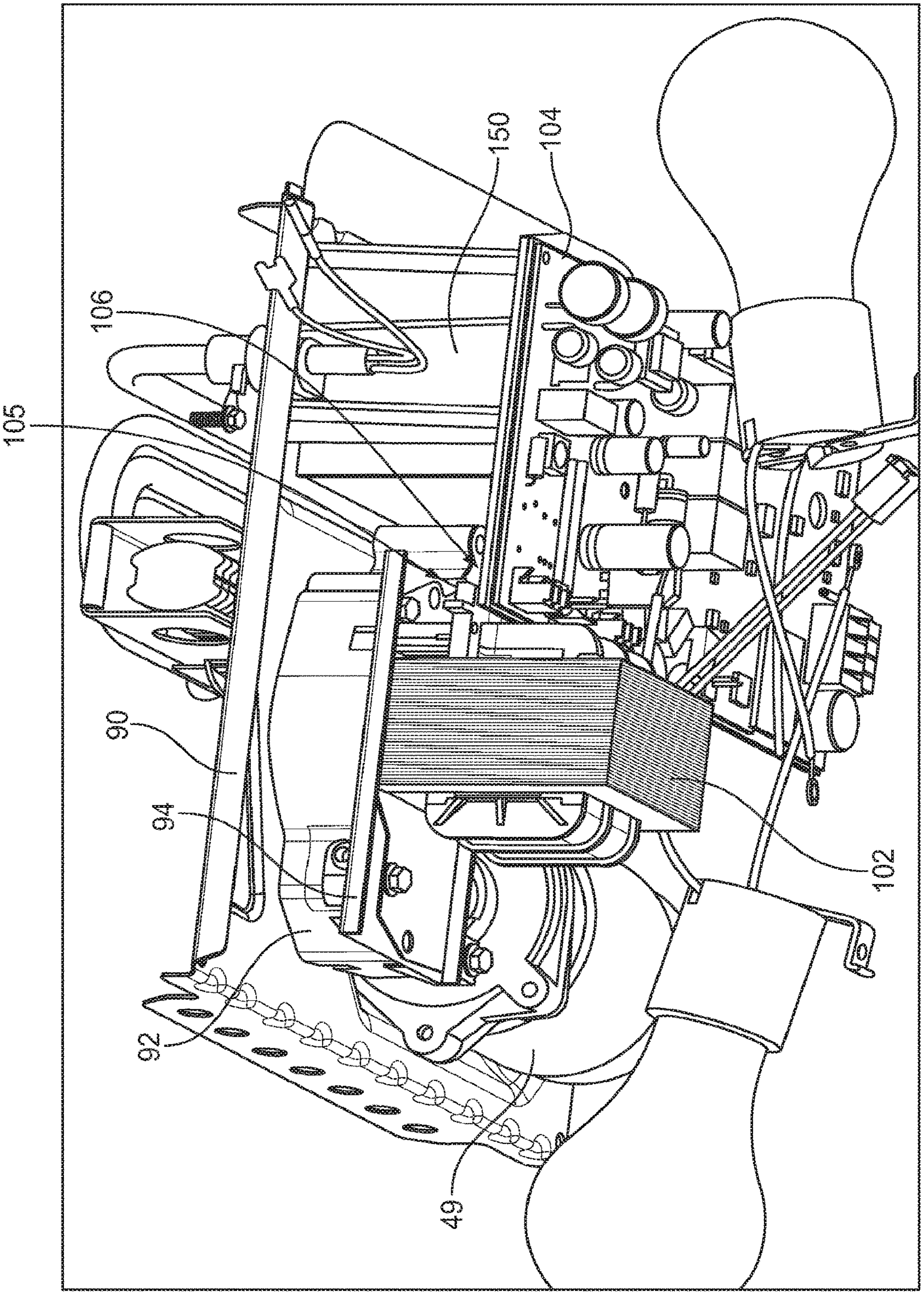
FIG. 4 is perspective view of a portion of the head unit of FIG. 1 with a cover of the head unit removed, FIG. 4 showing a motor mounted to a chassis of the head unit and a transformer mounted to a lockable transmission of the head unit.

With reference to FIGS. 3 and 4, the head unit 20 includes a transformer 102 mounted to the transmission 92 and a PCB assembly 104 that is mounted to the PCB support 94. The transformer 102 includes power connectors 105 that are in direct contact with power connectors 106 of the PCB assembly 104. The direct connection between the connectors 105 of the transformer 102 and the power connectors 106 of the PCB assembly 104 permits the transformer 102 and the printed circuit board assembly 104 to be electrically connected during assembly of the head unit 20. More specifically, during assembly the transmission 92 and PCB support 94 are first mounted to the chassis 90. The transformer 102 is then mounted to the transmission 92. Next, the PCB assembly 104 is positioned so that the power connectors 105, 106 are aligned and the PCB assembly 104 is mounted to the PCB support 94. Because the connectors 105, 106 are directly connected to each other, the head unit 20 does not need to include wire or cable connectors which add manufacturing complexity and cost in order to transfer electricity from the transformer to the PCB assembly 104.

Figure 5:
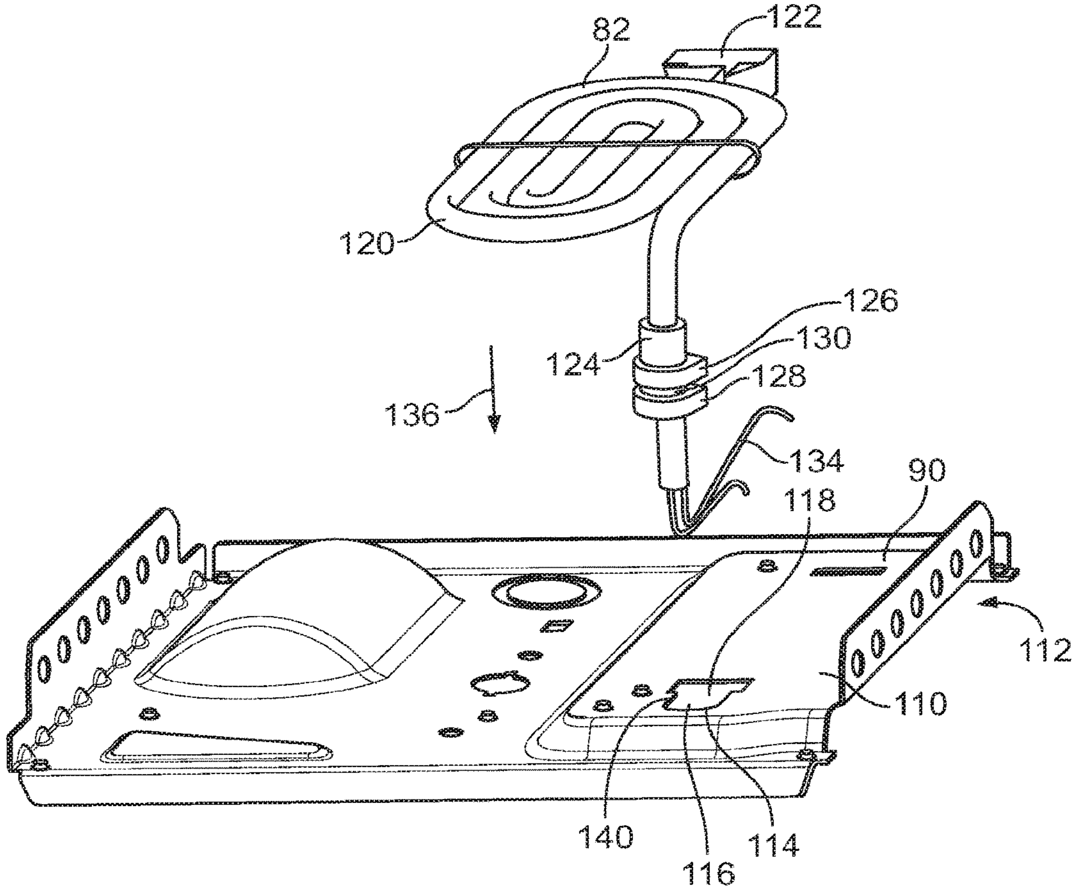
FIG. 5 is a perspective view of the chassis of FIG. 4 and a power cord of the head unit.

With reference to FIG. 5, the chassis 90 had a raised portion 110 that forms a portion of a battery-receiving recess 112. The raised portion 110 includes an opening 114 having a curved, narrow portion 116 and a rectangular, wide portion 118. The power cord 82 includes a jacketed wire or wires 120 and a plug 122. The power cord 82 further includes a retainer 124 sized to fit in the opening 114 and resist pull-through of the power cord 82 from the chassis 90. The retainer 124 includes a pair of flanges 126, 128 and a groove 130 therebetween.

Figure 6:
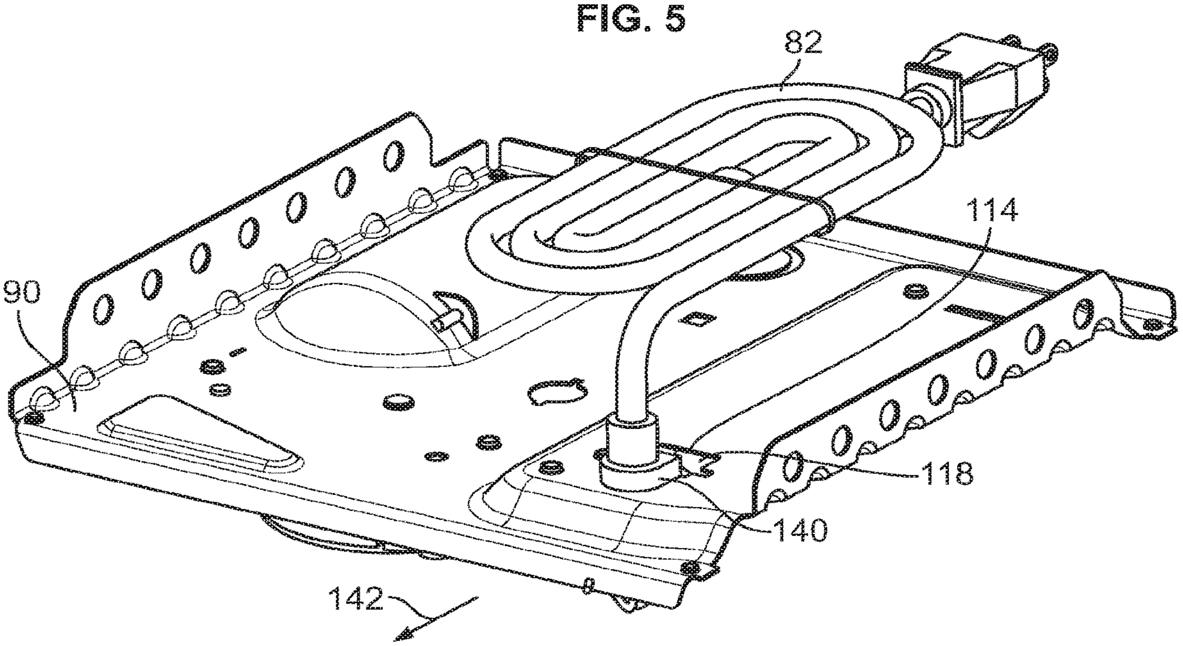
FIG. 6 is a perspective view similar to FIG. 5 showing the power cord connected to the chassis.

Regarding FIGS. 5 and 6, the power cord 82 is connected to the chassis 90 by advancing a leading end portion of the power cord 82, such as wires 134, in direction 136 into the wide portion 118 of the opening 114. The power cord 82 is advanced in direction 136 until the retainer 124 enters the opening 114 and the groove 130 thereof is vertically aligned with an edge 140 of the chassis 90 that extends about the opening 114. Next, the retainer 124 is shifted in direction 142 which causes engagement of the groove 130 of the retainer 124 with the edge 140 of the chassis 90. To keep the retainer 124 in the narrow portion 116, the PCB support 94 includes a wall 150 (see FIG. 4) that is positioned against the flanges 126 and 128. Thus, once the PCB support 94 has been mounted to the chassis 90, the wall 150 keeps the retainer 124 from shifting in a direction opposite direction 142 to the wide portion 118 of the opening 114 and thereby keeps the power cord 82 secured to the chassis 90.

Figure 7:
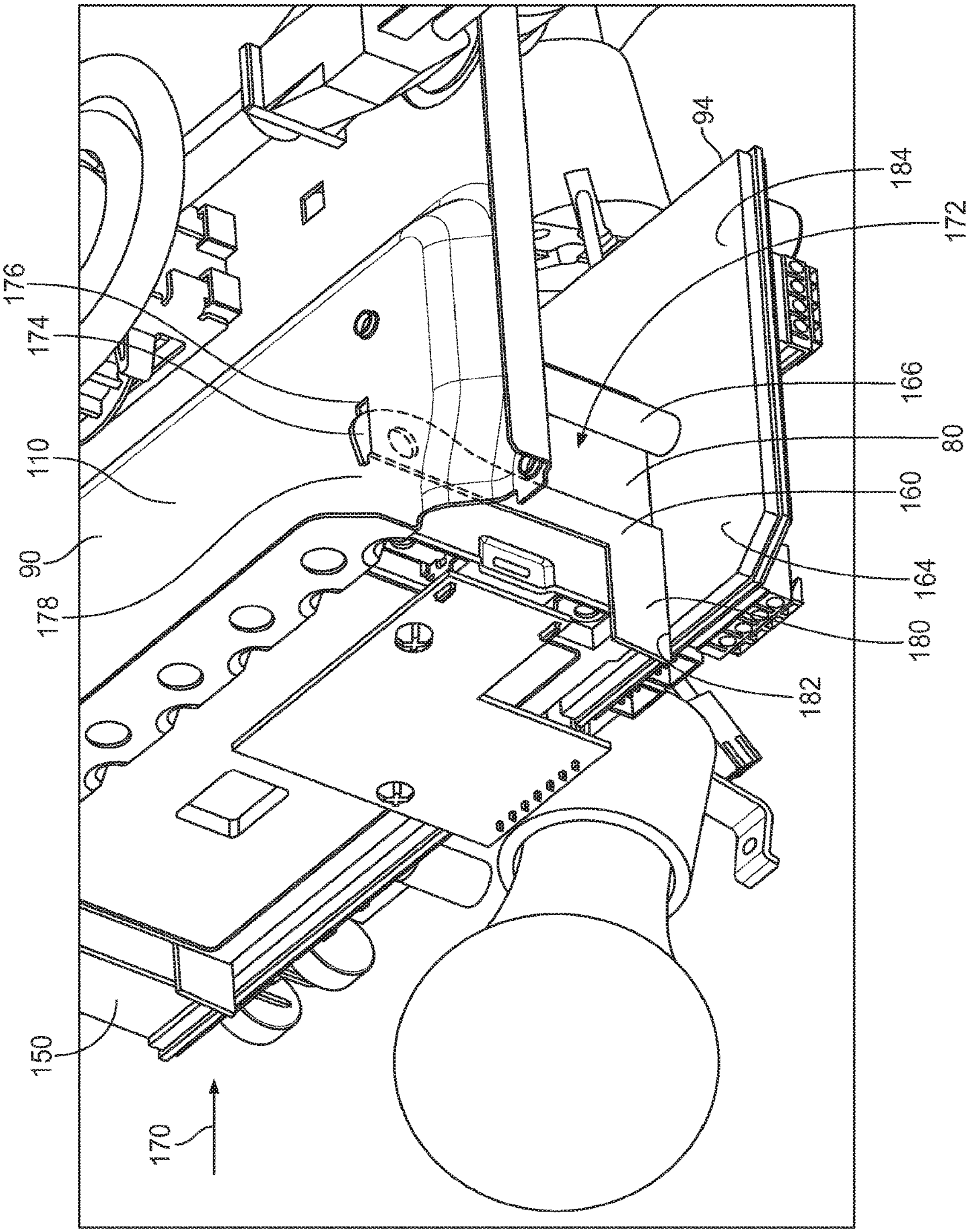
FIG. 7 is a perspective view of a battery of the head unit secured between the chassis and a printed circuit board support of the head unit.
Figure 8:
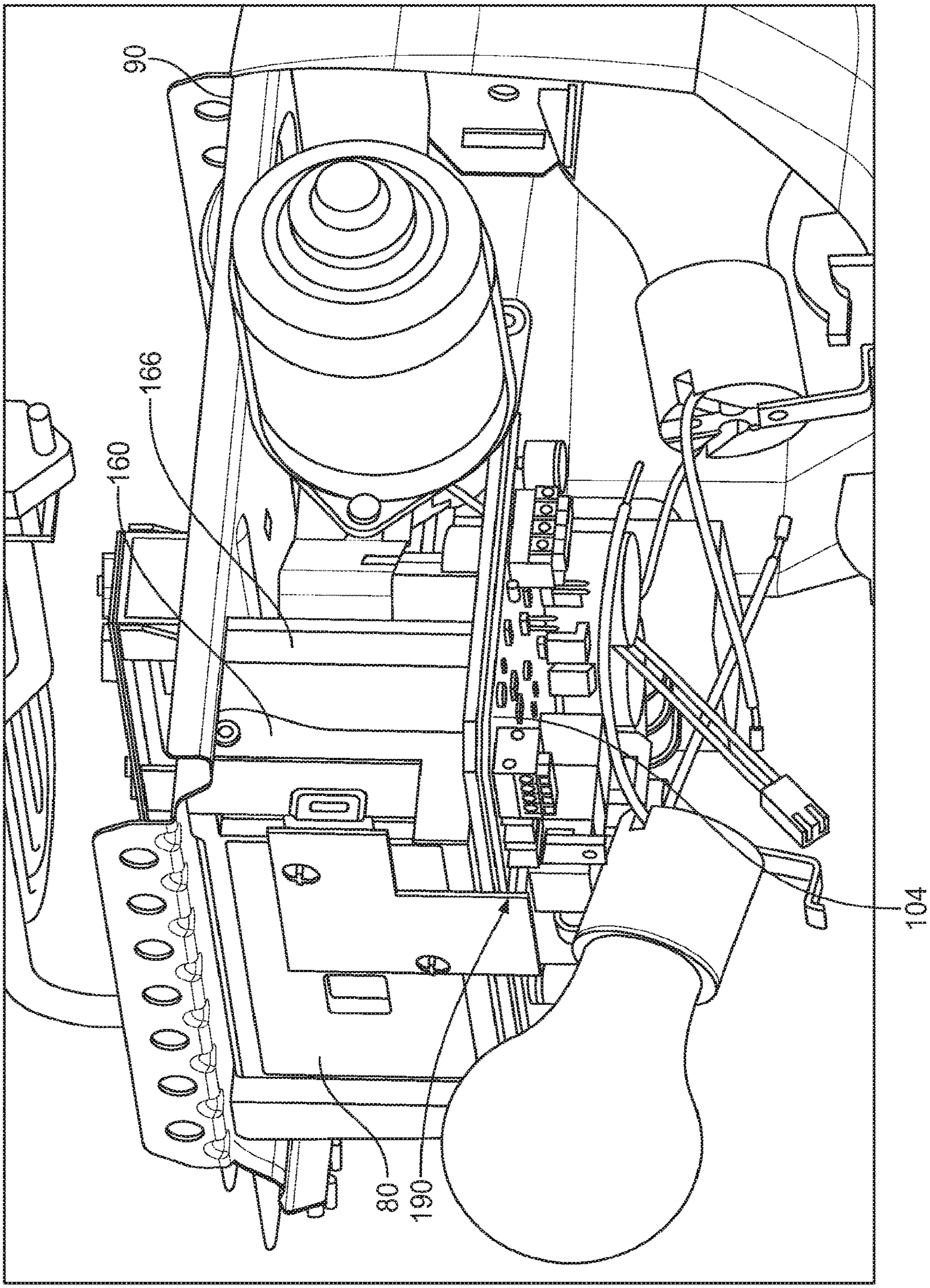
FIG. 8 is a perspective view of the head unit showing the printed circuit board mounted to an underside of the printed circuit board support.

With reference to FIG. 3, the battery 80 includes a pair of locking arms 160 pivotally connected to opposite sides of a battery housing 162 of the battery 80. The PCB support 94 includes a floor 164 and a post 166 upstanding from the floor 164 and spaced from the wall 150. The PCB support 94 receives the battery 80 in a recess 168 (see FIG. 1) between the wall 150 and the post 166. Turning to FIG. 7, the battery 80 has been advanced in direction 170 into a battery compartment 172 formed by the raised portion 110 of the chassis 90, the floor 164 of the PCB support 94, the wall 150 of the PCB support 94, and the post 166 of the PCB support 94. When the battery 80 is in the installed position in the compartment 172, each of the locking arms 160 has a hook portion 174 that extends through a slot 176 of the raised portion 110 and engages a portion 178 of the chassis 90 near the slot 176. The locking arm 160 also includes a base portion 180 with a bottom edge 182 that abuts against an upper surface 184 of the PCB support 94. With reference to FIG. 8, once the battery 80 has been installed, the battery 80 includes contacts 190 that are engaged with contacts of the PCB assembly 104 to provide power to the PCB assembly 104 during power outage situations.

Figure 9:
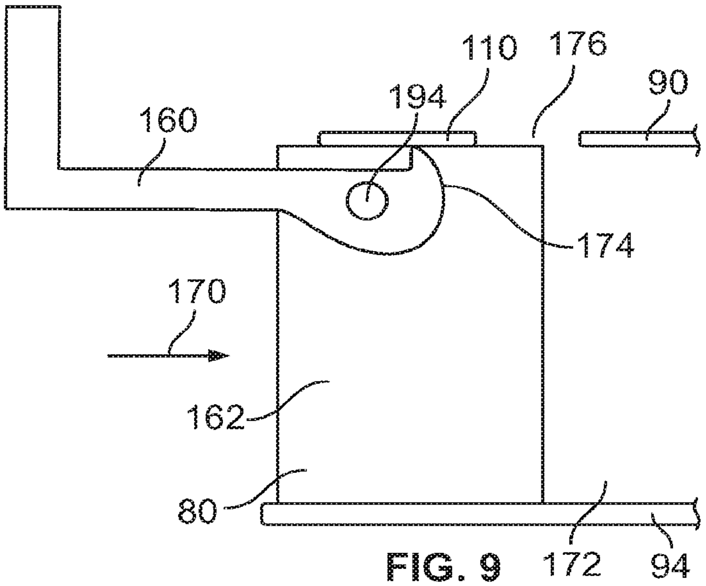
FIGS. 9, 10, and 11 are side elevational views of a locking arm of the battery pivoting and engaging the chassis and the printed circuit board support as the battery is advanced into an operating position.
Figure 10:
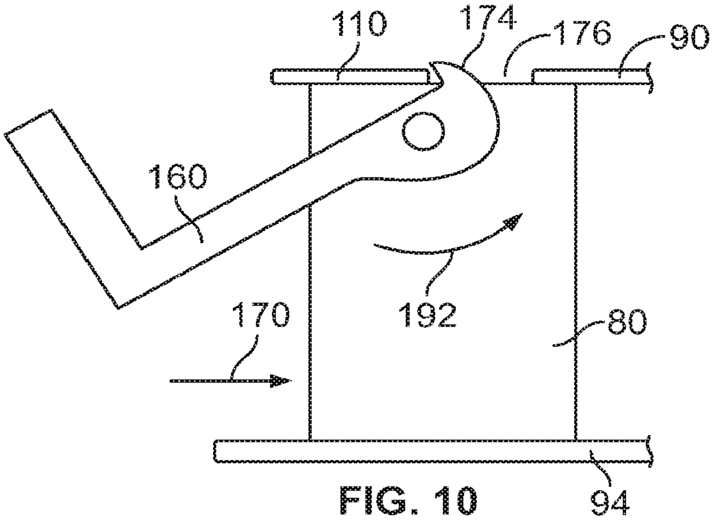
Figure 11:
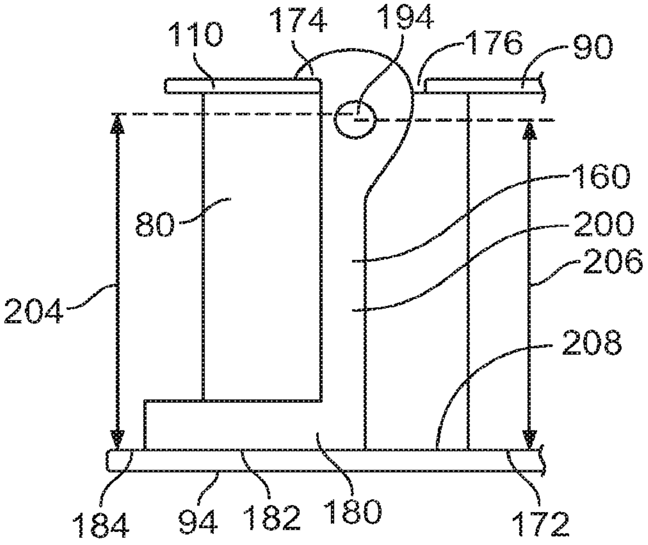

With reference to FIGS. 9-11, a side elevational view of the battery 80 and one of the locking arms 160 is provided to illustrate a method of installing the battery 80 in the battery compartment 172. Although only one locking arm 160 is shown, both locking arms 160 undergo similar movements as the battery 80 is installed in the battery compartment 172. The locking arms 160 may be connected by a member such as a rigid bar or tube so that the locking arms 160 move together during the battery installation process.

With reference to FIG. 9, each locking arm 160 is connected to the battery housing 162 at a pivot connection 194. Initially, the locking arm 160 is in an initial clearance position whereby the battery housing 162 may be advanced into the battery compartment 172 without the hook portion 174 interfering with the raised portion 110 of the chassis 90.

Regarding FIG. 10, the battery 80 has been advanced sufficiently far into the battery compartment 172 that the hook portion 174 can enter the slot 176 of the raised portion 110. As the hook portion 174 enters the slot 176, the locking arm 160 may pivot in direction 192. Regarding FIG. 11, the battery 80 is advanced in direction 170 due to pivoting of the locking arms 160 until the battery 80 reaches the installed position in the battery compartment 172. The person installing the battery 80 pivots the locking arm 160 in direction 192 to pivot the hook portion 174 into engagement with the raised portion 110 of the chassis 90. The locking arm 160 includes a vertical portion 200 and a base portion 180 that extend transversely to one another, such as at a right angle to each other. The base portion 180 includes a bottom edge 182 that engages the upper surface 184 of the PCB support 94. The locking arm 160 may have a distance 204 from a center of the pivot connection 194 to the bottom edge 182 of the base portion 180 that is greater than a distance 206 from the center of pivot connection 194 to a bottom 208 of the battery housing 162. Thus, the oversized locking arm 160 when pivoted to the installed position of FIG. 11 urges the battery 80 against the chassis 90 and maintains a firm connection of the battery 80 to the chassis 90 and the PCB assembly 104 mounted thereto.

Figure 12:
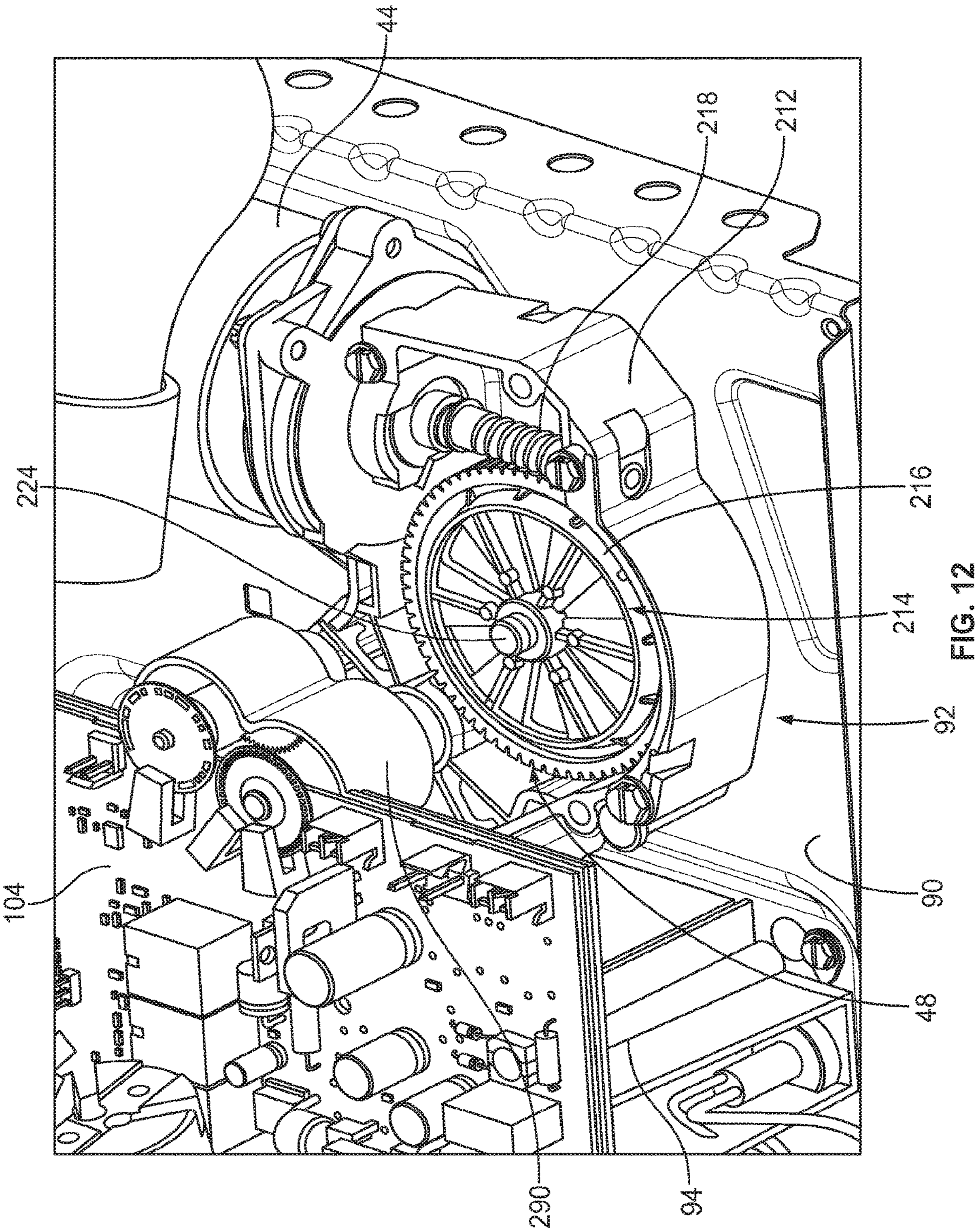
FIG. 12 is a perspective view of a portion of the head unit showing a cover of the transmission removed to illustrate the engagement between a worm driven by the motor and a worm wheel of the transmission.
Figure 13:
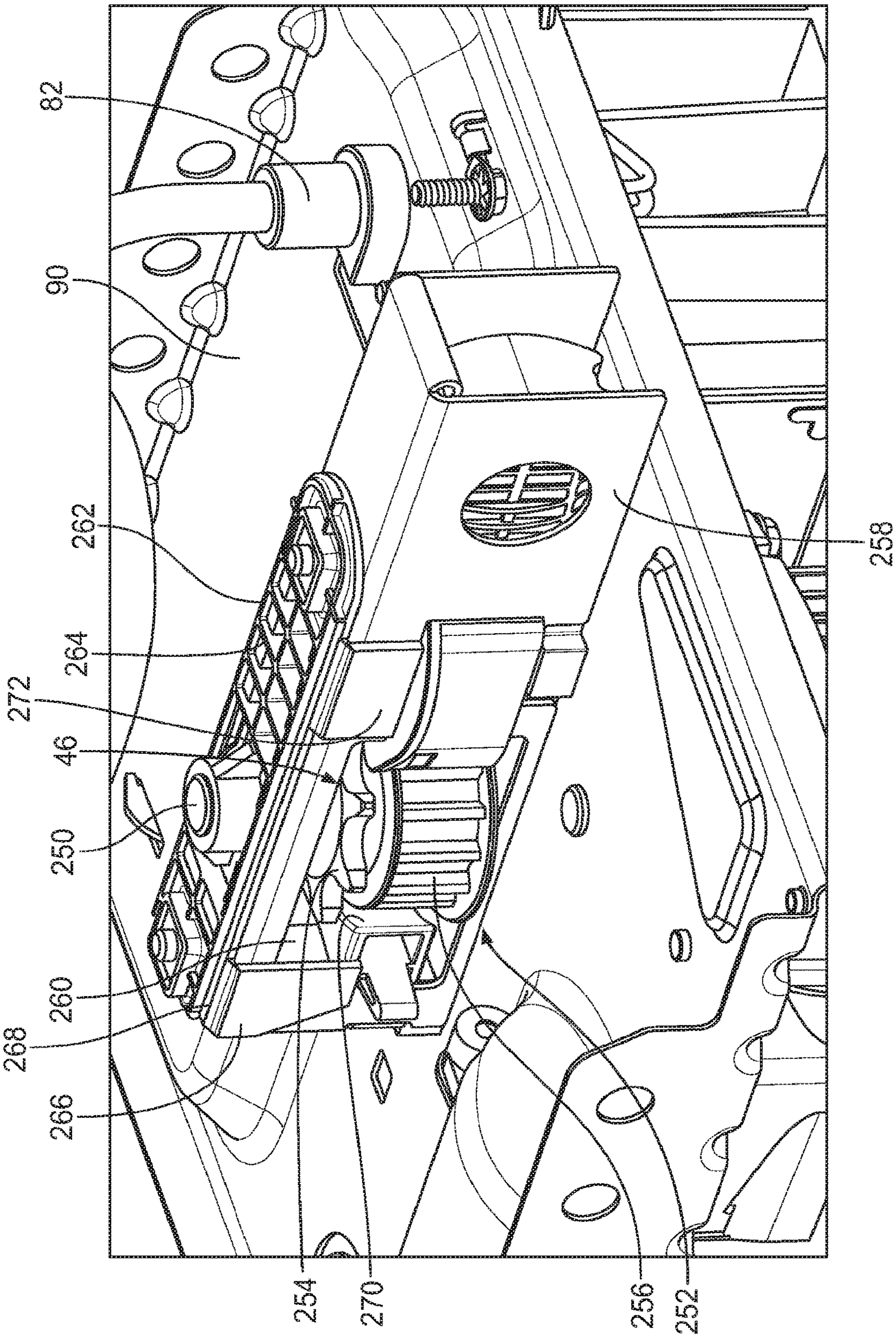
FIG. 13 is a perspective view of a portion of the head unit showing a rotatable drive of the head unit that is configured to drive either a chain or a belt.
Figure 18:
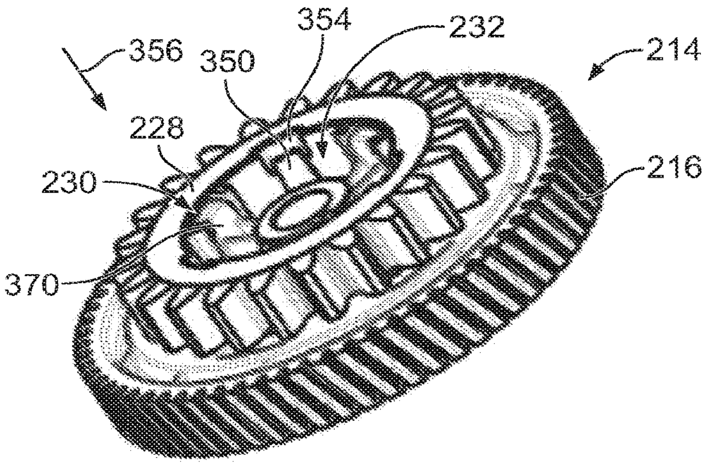
FIG. 18 is a perspective view of a compound gear of the lockable transmission which includes the worm wheel and the primary spur gear of FIG. 14.

With reference to FIG. 12, the transmission 92 is shown with a cover 210 (see FIG. 15) removed from a housing 212 of the transmission 92. With reference to FIGS. 12 and 13, the lockable transmission 48 of the head unit 20 includes a rotatable transmission component such as a compound gear 214 that includes a first gear, such as a worm wheel 216, driven by a worm 218 associated with a drive shaft 220 (see FIG. 14) of the motor 44. With reference to FIG. 18, the compound gear 214 includes a second gear, such as the spur gear 228, secured to the worm wheel 216 by way of mating portions 230 and one or more snap-fit connections 232. The compound gear 214 is rotatably mounted to a shaft 224 supported by the housing 212 as shown by FIG. 12.

Figure 14:
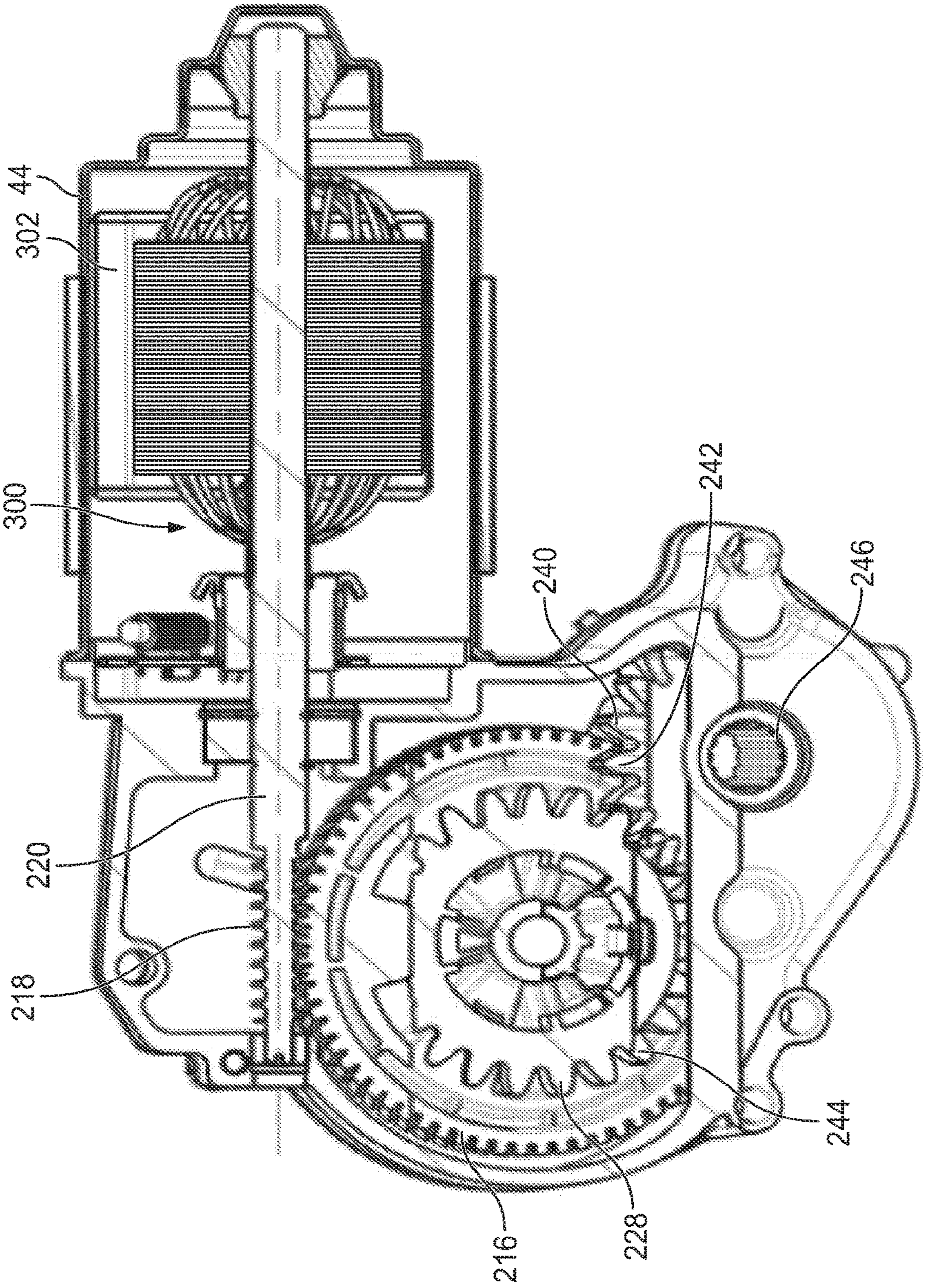
FIG. 14 is a cross-sectional view of the motor and transmission showing a primary spur gear mounted to the worm wheel and engaged with a secondary spur gear.

With reference to FIG. 14, the lockable transmission 48 includes a third gear, such as a spur gear 240, having teeth 242 engaged with teeth 244 of the spur gear 228. The spur gear 228 may be referred to herein as a primary spur gear and the spur gear 240 may be referred to a secondary spur gear since the spur gear 240 is driven by the spur gear 228. To engage the belt or chain 26, the rotatable drive 46 includes a rotatable member, such as a gear and pulley assembly 252, which includes a sprocket 254 and a drive pulley 256 mounted to an output shaft 250 (or integral therewith) as shown in FIG. 13. In other embodiments, the rotatable drive 46 includes only one of the sprocket 254 or the drive pulley 256 as desired for a particular application.

Regarding FIG. 14, the spur gear 240 has a through bore 246 that receives the output shaft 250 of the gear and pulley assembly 252. Thus, when the motor 44 causes turning of the worm 218, the worm 218 produces corresponding turning of the worm wheel 216, spur gear 228 secured thereto, spur gear 240, output shaft 250, and the sprocket 254 and pulley 256. In one embodiment, the rotary encoder 86 may be an absolute positioning encoder 290 (see FIG. 12) that interacts with a disc mounted to the output shaft 250. Thus, as the output shaft 250 turns, the controller 56 can determine the position of the garage door 14.

The gear and pulley assembly 252 can be connected to either a belt or a chain 26 and provides flexibility for installation of the head unit 20. Regarding FIG. 13, the body 50 in some instances includes a rail section 258 for being connected to the rail 24. The rail section 258 includes an opening 260 through which the belt or chain 26 utilized with the head unit 20 can extend and engage the sprocket 254 or drive pulley 256. The head unit 20 includes a guide 262 that is connected to the rail section 258 and guides the belt or chain 26 about the sprocket 254 or drive pulley 256. The guide 262 includes a base portion 264 and side members 266 connected via one or more hinges 268 (e.g., living hinges) to the base portion 264. During assembly of the head unit 20, the base portion 264 is positioned on the rail section 258 and the side members 266 are folded downward onto opposite sides of the rail section 258. The base portion 264 and the side members 266 are secured to the rail section 258 by one or more fasteners and/or snap-fit connections. If a belt is utilized, the side members 262 include belt backing members 270 that extend around the drive pulley 256 and resist the belt from disengaging from the drive pulley 256. If the chain 26 is utilized, the side members 266 also include chain spacing members 272 that limit pinch points of the chain 26 near the sprocket 254.

Figure 15:
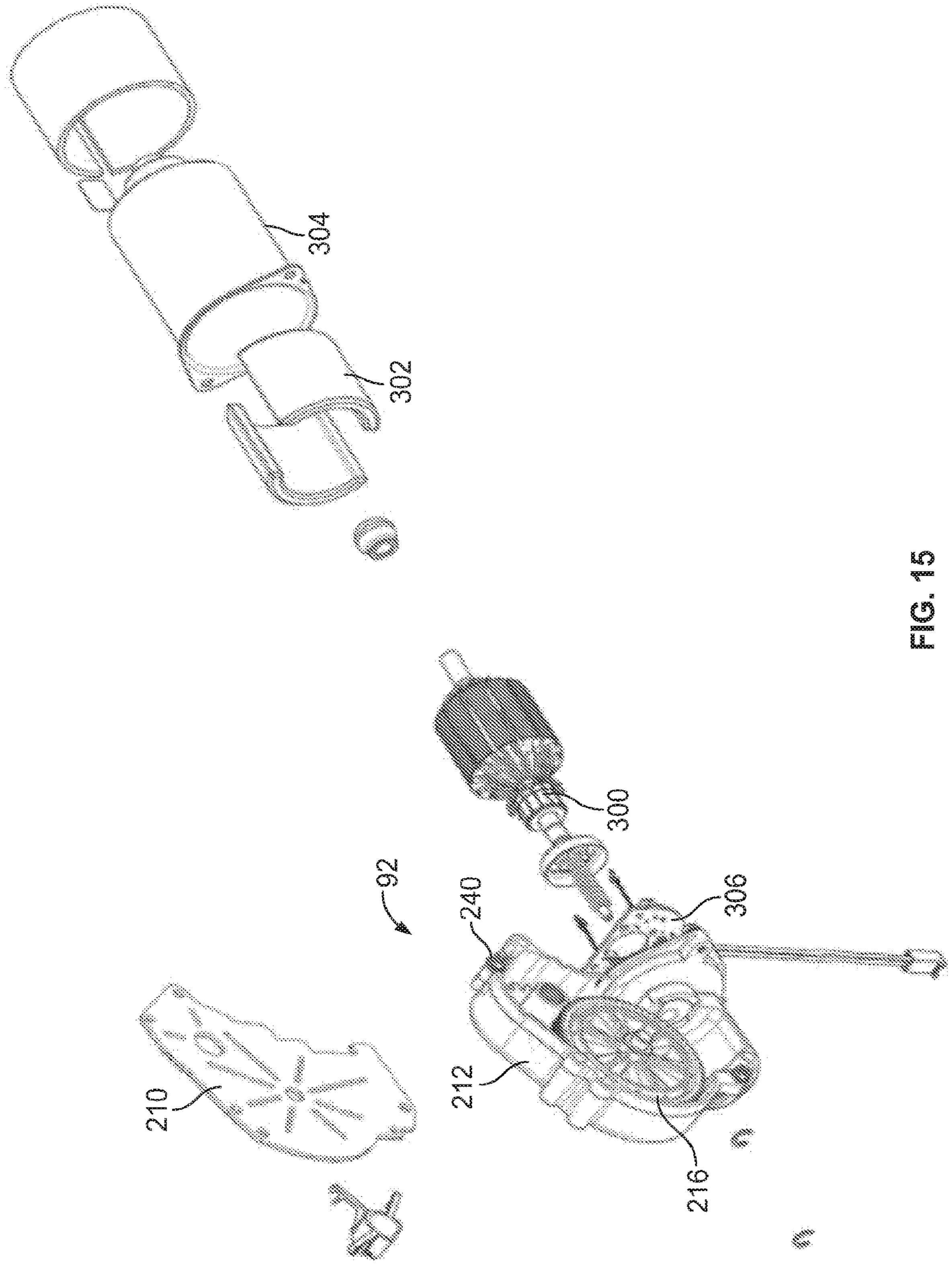
FIG. 15 is an exploded view of the motor and transmission of FIG. 12.

With reference to FIGS. 14 and 15, the worm 218 may have a unitary, one-piece construction with the drive shaft 220 of the motor 44. In other forms, the worm 218 is a separate component assembled to the drive shaft 220. The motor 44 may be selected from various types known in the art including, for example direct current (DC) motors, induction motors, synchronous motors, etc. As shown, the motor 44 includes an armature assembly 300 and magnets 302. The motor 44 includes a housing 304 mounted to the housing 212 of the transmission 92. The motor 44 includes a circuit board 306 for controlling electrical power to the armature assembly 300.

Figure 16:
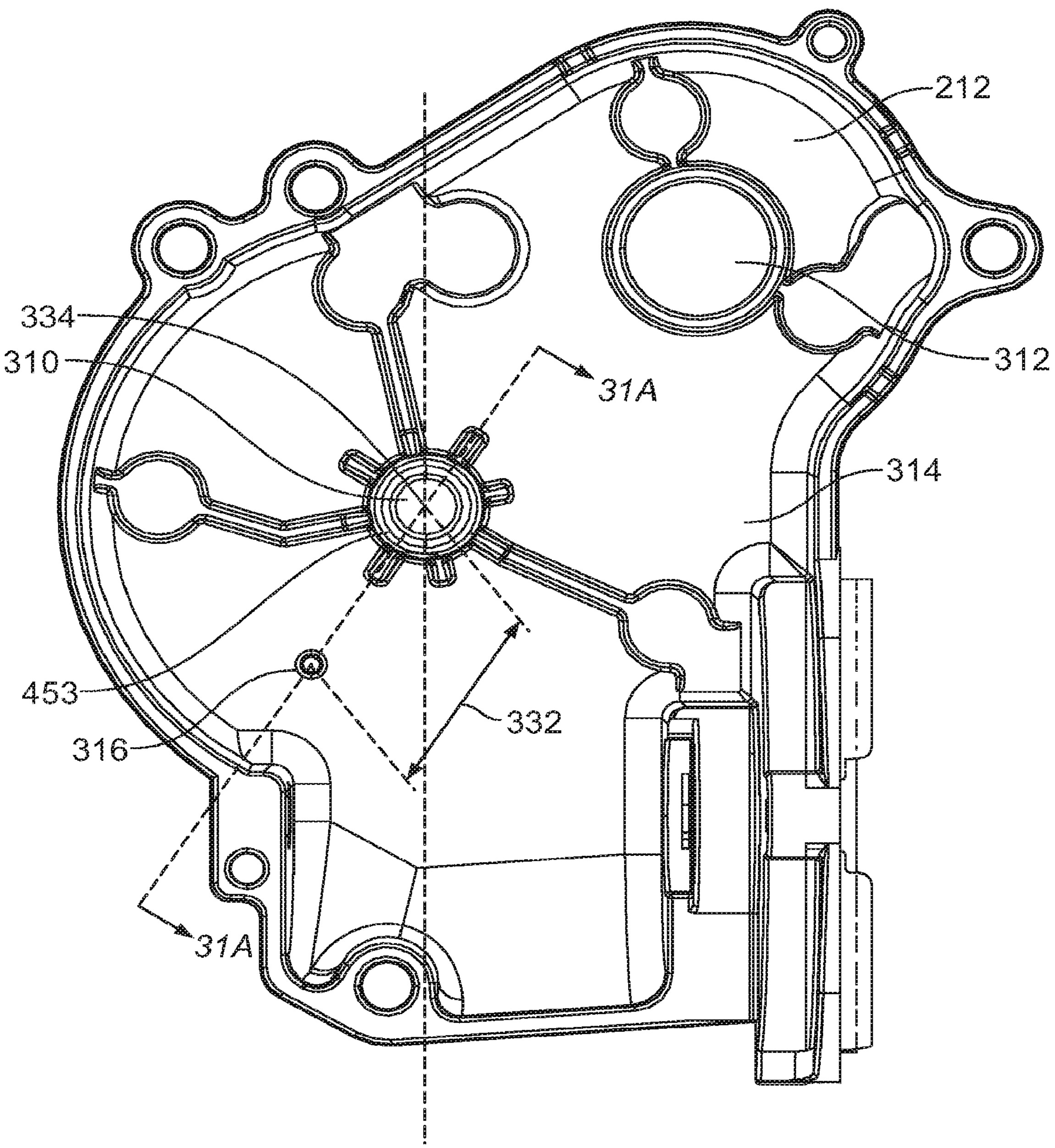
FIG. 16 is a plan view of an interior of a housing of the transmission of FIG. 15.
Figure 17A:
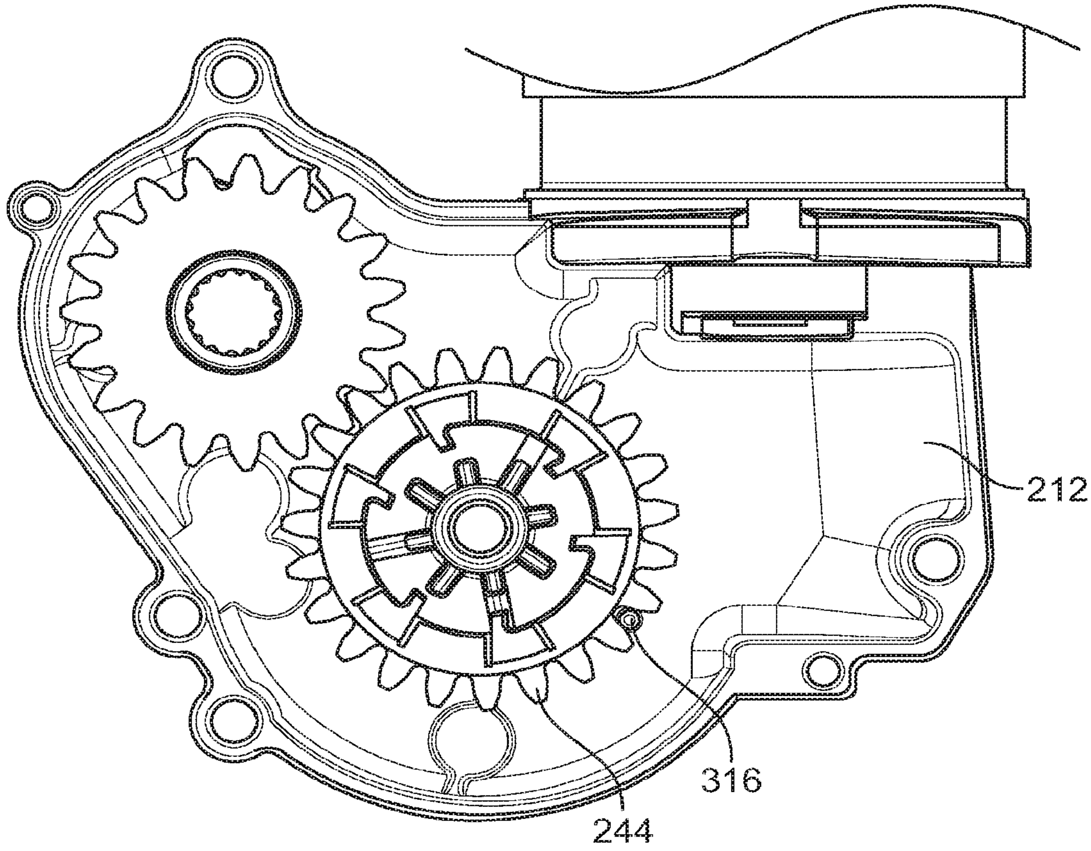
FIG. 17A is a plan view of the housing of FIG. 17 showing the primary and secondary spur gears within the housing.
Figure 17B:
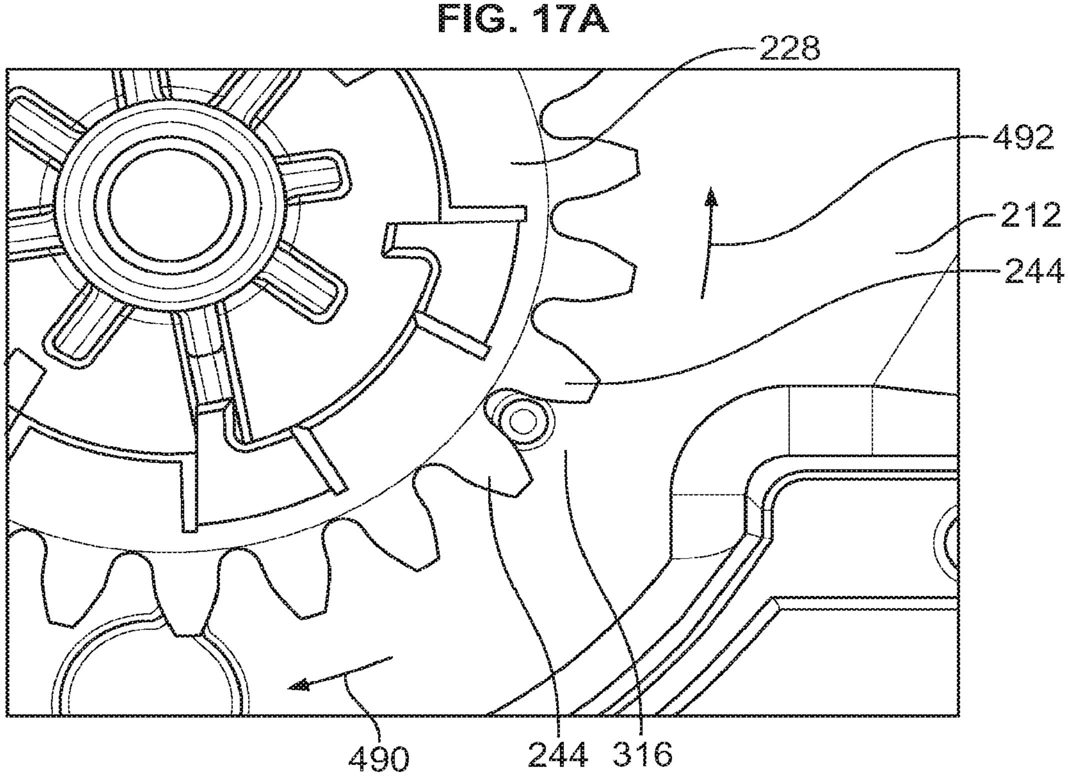
FIG. 17B is an enlarged portion of FIG. 17A showing a protrusion of the housing sized to fit between teeth of the primary spur gear once the primary gear has been shifted into the page.

With reference to FIGS. 16 and 17, housing 212 of the transmission 92 includes a through opening 310 that receives the shaft 224 of the compound gear 214 and a through opening 312 that receives the output shaft 250 of the spur gear 240. The housing 212 includes a base wall 314 and a stop, such as a protrusion 316. In one form, the protrusion 316 is formed by coining the material of the base wall 314. With reference to FIG. 31B, the protrusion 316 has a height 318 that extends above an inner surface of the wall 314.

Regarding FIG. 16, the protrusion 316 is spaced a radial distance 332 away from an axis 334 of rotation of the spur gear 228, e.g., the centerline of the shaft 224. The distance 332 is less than a radius from the axis 334 to the radially outermost point of the teeth 244 of the gear 228. As discussed in greater detail below, the spur gear 228 shifts axially along the shaft 224 away from the worm wheel 216 in response to a torque applied to the shaft 224 exceeding a predetermined threshold. The distance 332 as well as the size and shape of the protrusion 316 are selected so that the protrusion 316 extends into a gap between two of the teeth 244 (see FIG. 17B) of the spur gear 228 when the spur gear 228 shifts axially along the shaft 224 away from the worm wheel 216. Once the protrusion 316 extends into the gap between the teeth 244 of the spur gear 228, the protrusion 316 acts as a brake to hold the spur gear 228 substantially immobile and fixed relative to the housing 212 of the transmission 92. Although the spur gear 228 may turn a small distance due to some clearance between the teeth 244 and the protrusion 316, the spur gear 228 is generally fixed against free rotation relative to the housing 212. Because the spur gear 228 is fixed relative to the housing 212, the spur gear 228 inhibits rotation of the spur gear 240 (which is engaged with the spur gear 228), the output shaft 250, and the gear and pulley assembly 252 mounted to (or integral with) the output shaft 250. Further, the gear and pulley assembly 252 held by the spur gear 228 inhibits movement of the belt or chain 26 and therefore prevents associated movement of the garage door 14. In this manner, the head unit 20 stops the garage door 14 in position after a high-torque event at the output shaft 250.

Figure 21:
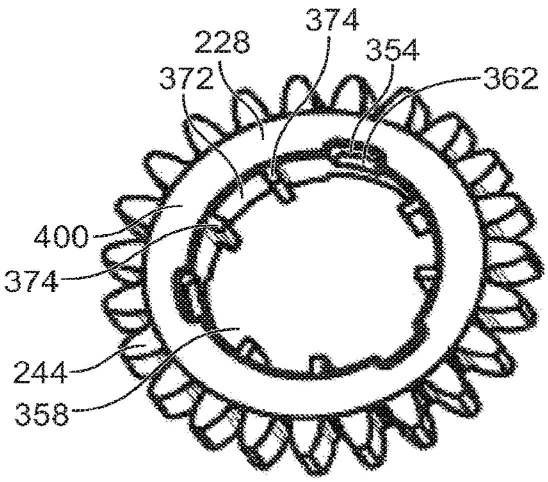
FIG. 21 is a perspective view of the primary spur gear of FIG. 18 showing radially extending projections of the primary spur gear that receive therebetween alignment tabs of the worm wheel.

With reference to FIG. 18, the snap-fit connections 232 connect the spur gear 228 to the worm wheel 216 when the lockable transmission 48 is in the unlocked configuration. The snap-fit connections 232, however, may disengage and permit the spur gear 228 to shift away from the worm wheel 216 and engage the protrusion 316 of the housing 212 of the transmission 92. The snap-fit connections 232 include snap-fit tabs 350 having barbs 352 (see FIG. 26) that engage pockets 354 of the spur gear 228. During assembly of the compound gear 214, the spur gear 228 is advanced in direction 356 (see FIG. 18) so that the snap-fit tabs 350 enter a central opening 358 (see FIG. 21) of the spur gear 228. Alternatively, the spur gear 228 is stationary and the worm wheel 216 is advanced in a direction opposite to direction 356, or the worm wheel 216 and the spur gear 228 are brought together in direction 356 and the opposite thereof.

Figure 23:
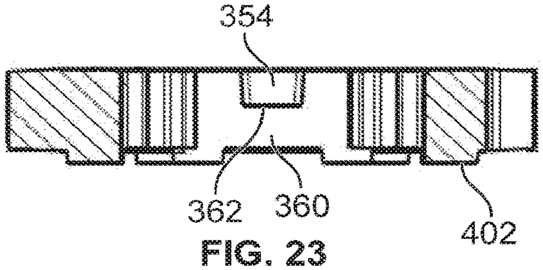
FIG. 23 is a cross-sectional view taken across line 23-23 in FIG. 22 showing one of the pockets of the primary spur gear.

The barbs 352 cam radially inward around walls 360 (see FIG. 23) until the barbs 352 are vertically aligned with the pockets 354 and snap into the pockets 354. The barbs 352 are in overlapping relation with ledges 362 of the pockets 354 and resist axial movement of the spur gear 228 away from the worm wheel 216. Despite the spur gear 228 and the worm wheel 216 being shown and described herein as including interference features (e.g., snap-fit connections 232), it should be appreciated that the compound gear 214 may be configured otherwise. For example, the interference features may be augmented with or replaced by a fastener (or fasteners) such as one or more of screws, bolts, glue, welds, etc. Furthermore, although the example compound gear 214 includes three snap-fit connections 232 arcuately spaced about 120° apart from each other, nevertheless the compound gear 214 may be configured with fewer or additional snap-fit connections. Furthermore, the various complementary portions of the spur gear 228 and the worm wheel 216 that facilitate alignment, joining, and power/torque transfer may be configured otherwise. Examples of alternative embodiments of the spur gear 228 and the worm wheel 216 are provided in the drawing appendix submitted herewith.

Figure 24:
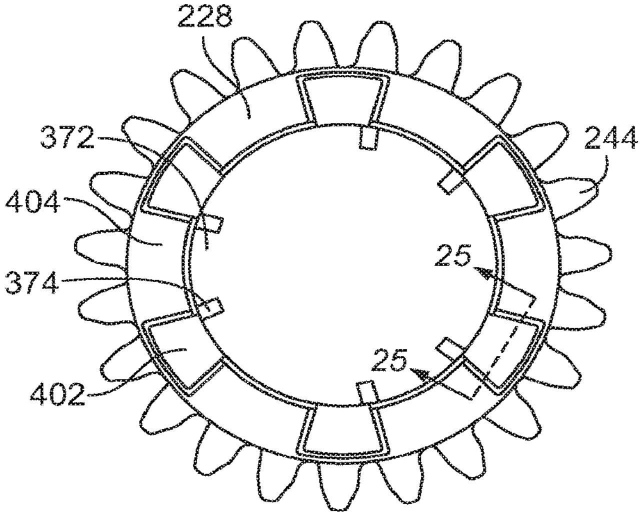
FIG. 24 is a bottom plan view of the primary spur gear of FIG. 21 showing ridges spaced circumferentially about the primary spur gear configured to engage recesses of the worm wheel and drive the primary spur gear with rotation of the worm wheel.
Figure 26:
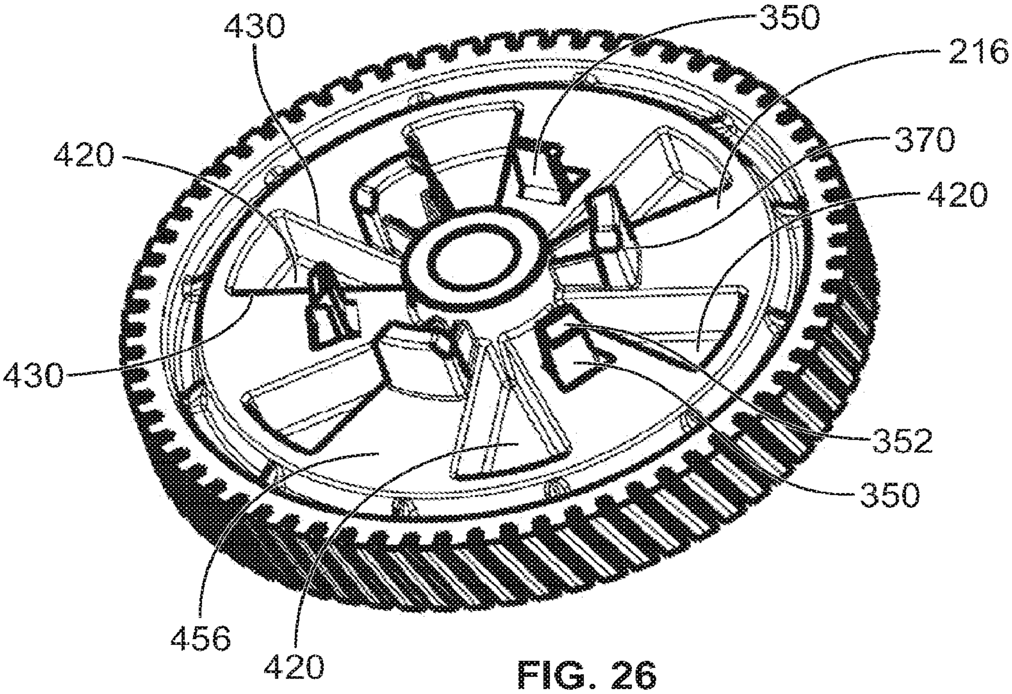
FIG. 26 is a perspective view of the worm wheel of FIG. 18 showing the upstanding snap-fit tabs and alignment tabs of the worm wheel.

With reference to FIGS. 24 and 26, the spur gear 228 includes a radially inner annular body 400 and the teeth 244 extending outward from the annular body 400. The annular body 400 includes ridges 402 spaced circumferentially about the body 400 that are sized to extend into recesses 420 of the worm wheel 216. The worm wheel 216 includes a pair of walls 430 extending along either side of each of the recesses 420. The mating portions 230 (see FIG. 18) of the compound gear 214 include the ridges 402 and the walls 430. To transfer rotary movement of the worm wheel 216 to the spur gear 228 when the lockable transmission 48 is in the unlocked configuration, the ridges 402 and the walls 430 engage as the worm wheel 216 is driven by the worm 218.

Figure 20:
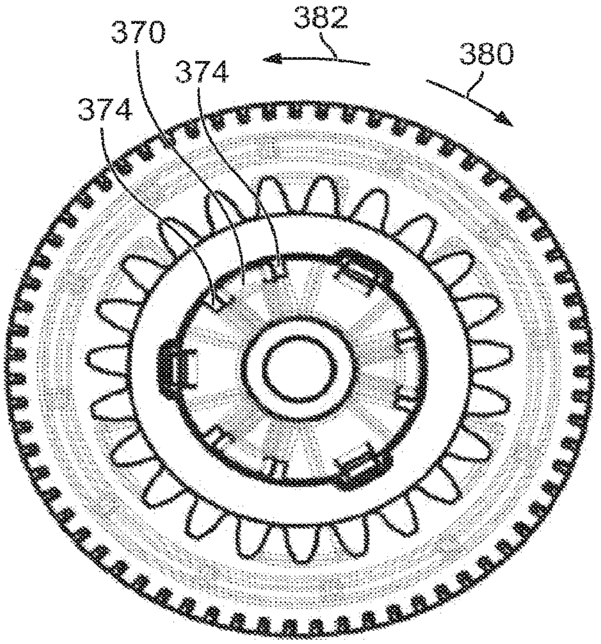
FIG. 20 is a plan view of the compound gear of FIG. 18 showing snap-fit tabs of the worm wheel engaged with pockets of the primary spur gear.

The mating portions 230 also include alignment tabs 370 (see FIG. 26) of the worm wheel 216 that are received in gaps 372 (see FIG. 21) between radially extending projections 374 of the spur gear 228. The alignment tabs 370 ensure that the ridges 402 of the spur gear 228 are axially aligned with the recesses 420 of the worm wheel 216 as the spur gear 228 and worm wheel 216 are connected together. Further, each alignment tab 370 of the worm wheel 216 is held snuggly between a pair of the projections 374 of the spur gear. Thus, when the worm wheel 216 turns in direction 380 or direction 382 (see FIG. 20), the alignment tabs 370 engage one of the projections 374 and assist in causing turning of the spur gear 228 in the same direction 380, 382.

The compound gear 214 permits the use of different materials for the worm wheel 216 and the spur gear 228. In one example, the worm wheel 216 is made of a plastic material and the spur gear 228 is made of a metallic material, such as steel. The plastic material of the worm wheel 216 may be softer than the material of the worm 218, which may be made of plastic or metal. Thus, even if the worm wheel 216 or the entire compound gear 214 binds or otherwise becomes stuck, the worm 218 may still rotate thereby causing the worm 218 to strip the worm wheel 216 without damaging the worm 218. For example, the worm 218 may strip the worm wheel 216 when the motor 44 drives the worm 218 and the garage door 14 remains stationary such as due to the trolley 22 or chain 26 binding up. A repair person may then replace the compound gear 214 and not have to replace the worm 218 which may be a component of the motor drive shaft 220.

Figure 19:
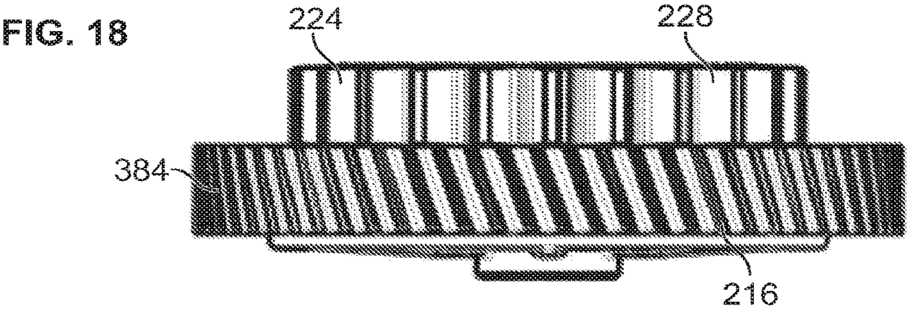
FIG. 19 is an elevational view of the compound gear of FIG. 18 showing the different teeth spacing of the worm wheel and the primary spur gear.

Another advantage of the compound gear 214 is that the worm wheel 216 and/or spur gear 228 may be selected for a specific gear ratio to provide different speeds of the garage door 14 for different applications while utilizing the same worm 218 and gear and pulley assembly 252. For example, for applications that specify a faster garage door 14, a spur gear 228 may be selected that has a larger outer diameter and more teeth 244. For applications that specify a slower garage door 14, a smaller spur gear 228 with a smaller number of teeth 244 than the number of teeth 384 of the worm wheel 216 may be selected (see FIG. 19). Once the desired spur gear 228 is selected, the spur gear 228 is assembled with the worm wheel 216. In this manner, different door speeds may be provided by tailoring the compound gear 216 to provide the desired gear ratio. Such a gear customization makes it easier for the head unit 20 to operate in a wider range of environments, contexts or applications.

Figure 27:
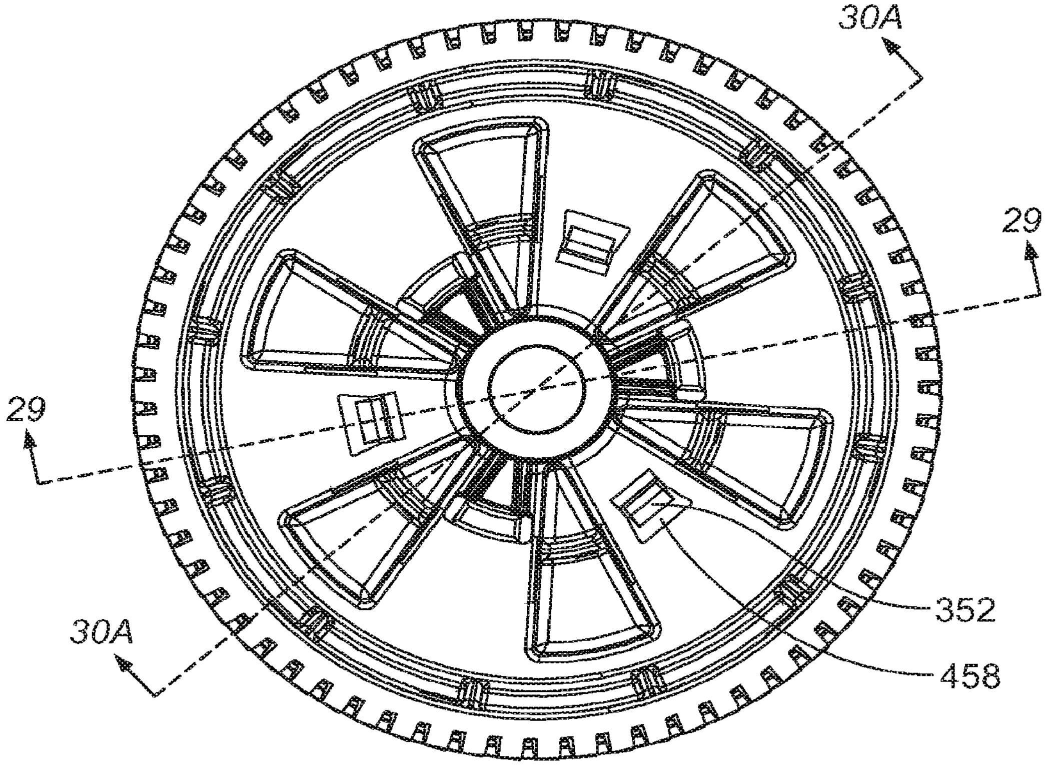
FIG. 27 is a top plan view of the worm wheel of FIG. 26 showing generally triangular recesses separating the snap-fit tabs and the alignment tabs, the recesses being sized to receive the drive ridges of the spur gear.
Figure 28:
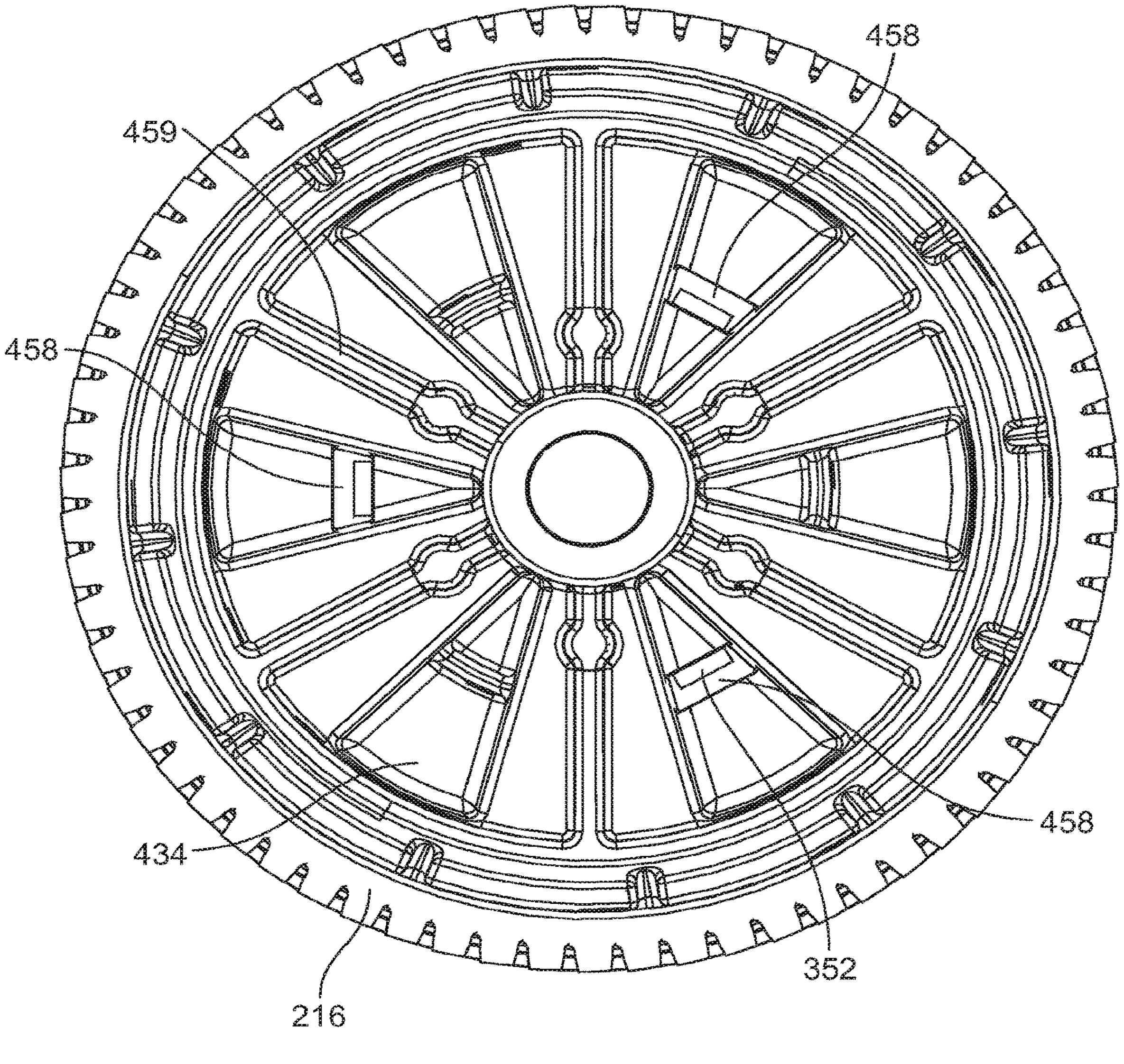
FIG. 28 is a bottom plan view of the worm wheel of FIG. 27 showing through openings in the worm wheel.
Figure 29:
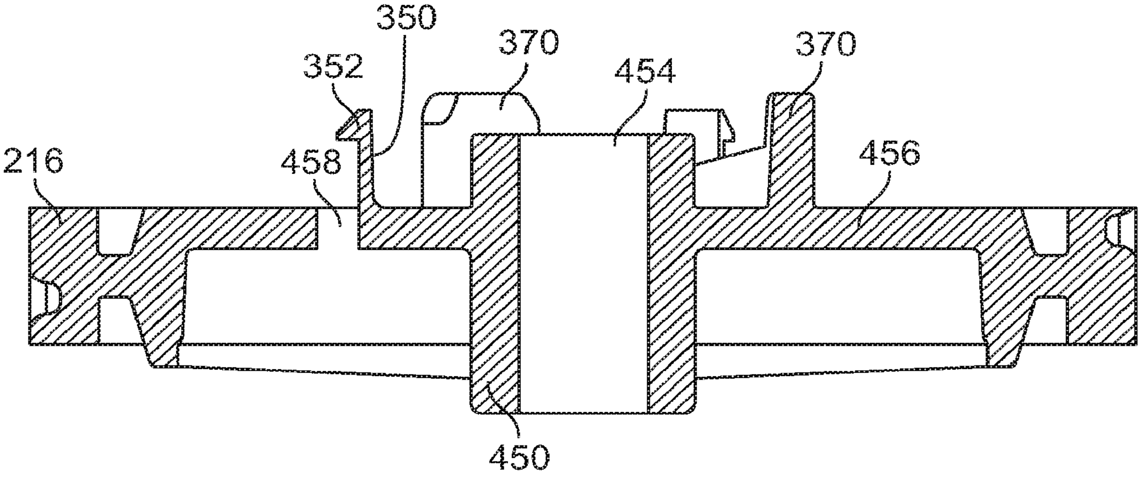
FIG. 29 is a cross-sectional view taken across line 29-29 in FIG. 27 showing a snap-fit tab and an alignment tab upstanding from an upper wall of the worm wheel.
Figure 30A:
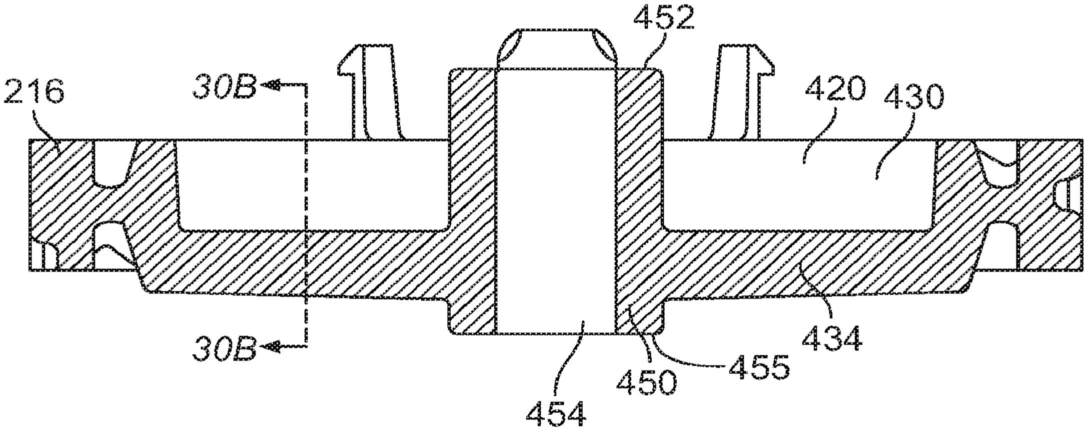
FIG. 30A is a cross-sectional view taken across line 30A-30A in FIG. 27 showing the sleeve of the worm wheel that receives a shaft.

With reference to FIGS. 30A and 31, the worm wheel 216 has a sleeve 450 with a through bore 454 that receives the shaft 224 and permits the worm wheel 216 to turn about the shaft 224. The worm wheel 216 is constrained against axial movement along the shaft 224 because the worm wheel sleeve 450 has an end 452 at a shaft support 453 of the transmission housing base wall 314 and an end 455 at the transmission housing cover 210. Further, with reference to FIGS. 26 and 29, the worm wheel 216 includes walls 456 that separate the recesses 420 and from which the snap-fit tabs 350 and alignment tabs 370 are upstanding therefrom. The walls 456 may include openings 458 (see FIGS. 27 and 28) at the base of the snap-fit tabs 350 to facilitate molding of the worm wheel. As further shown in FIG. 28, interposed between the openings 458 the worm wheel 216 includes ribs 459 that radially extend as raised, spoke-like features from the worm wheel sleeve 450 to provide additional stiffness for resisting twisting or other deformation of the worm wheel 216.

Figure 22:
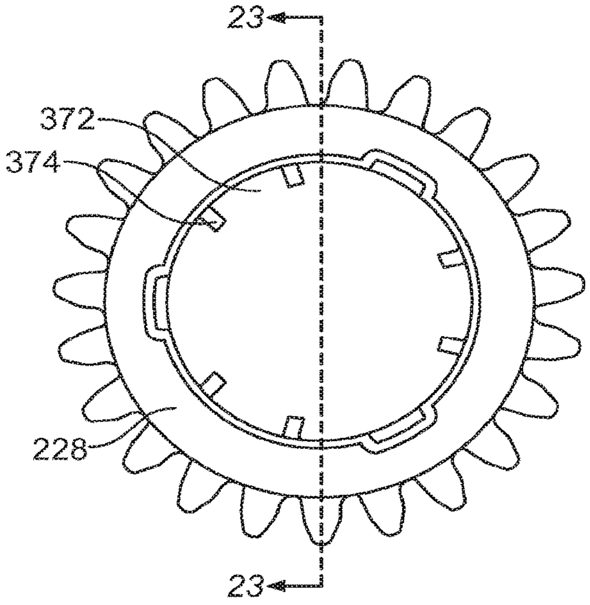
FIG. 22 is a plan view of the primary spur gear of FIG. 21 showing a central opening of the spur gear.
Figure 25:
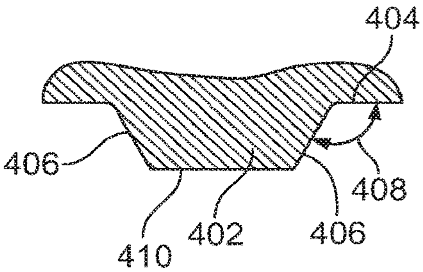
FIG. 25 is a cross-sectional view taken across line 25-25 in FIG. 24 showing ramp surfaces of one of the ridges.

With reference to FIGS. 22 and 24, the spur gear 228 includes at least one ramp portion for shifting the spur gear 228 axially away from the worm wheel 216 in response to a torque applied to the gear and pulley assembly 252 exceeding the predetermined threshold. In one example, the at least one ramp portion includes the ridges 402 of the spur gear 228. Extending between the ridges 402 are flats 404. With reference to FIG. 25, each ridge 402 includes a ramp surface 406 extending on either side of the ridge 402 at an angle 408 relative to the adjacent flat 404. Each ridge 402 also includes a flat surface 410 extending between the ramp surfaces 406.

Figure 30B:
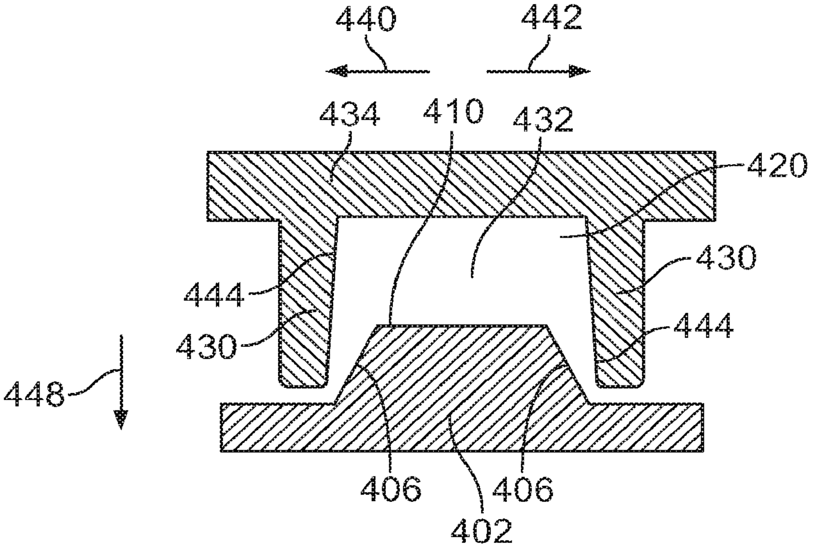
FIG. 30B is a cross-sectional view of the worm wheel taken generally across line 30B-30B in FIG. 30A, FIG. 30B showing the worm wheel inverted and above the primary spur gear of FIG. 21 and one of the drive ridges of the primary spur gear received in one of the recesses of the worm wheel and the ramp surfaces of the drive ridge positioned to cam against walls of the worm wheel on either side of the recess.

With reference to FIG. 26, the ridges 402 fit into the recesses 420 that separate the alignment tabs 370 and snap-fit tabs 350. With reference to FIG. 30B, when each ridge 402 is in a respective recess 420, the ramp surfaces 406 face the walls 430 of the worm wheel 216 which extend along either side of the recess 420. In one embodiment, there is a gap 432 between the flat surface 410 and a wall 434 of the worm wheel 216.

When a sufficiently high torque is applied to the output shaft 250 and transmitted to the spur gear 228 via the spur gear 240, the spur gear 228 will turn in one of the directions 440, 442 which causes a camming engagement between one of the ramp surfaces 406 and the side surface 444 of one of the walls 430. The camming engagement shifts the spur gear 228 axially in direction 448 away from the worm wheel 216.

Figure 31A:
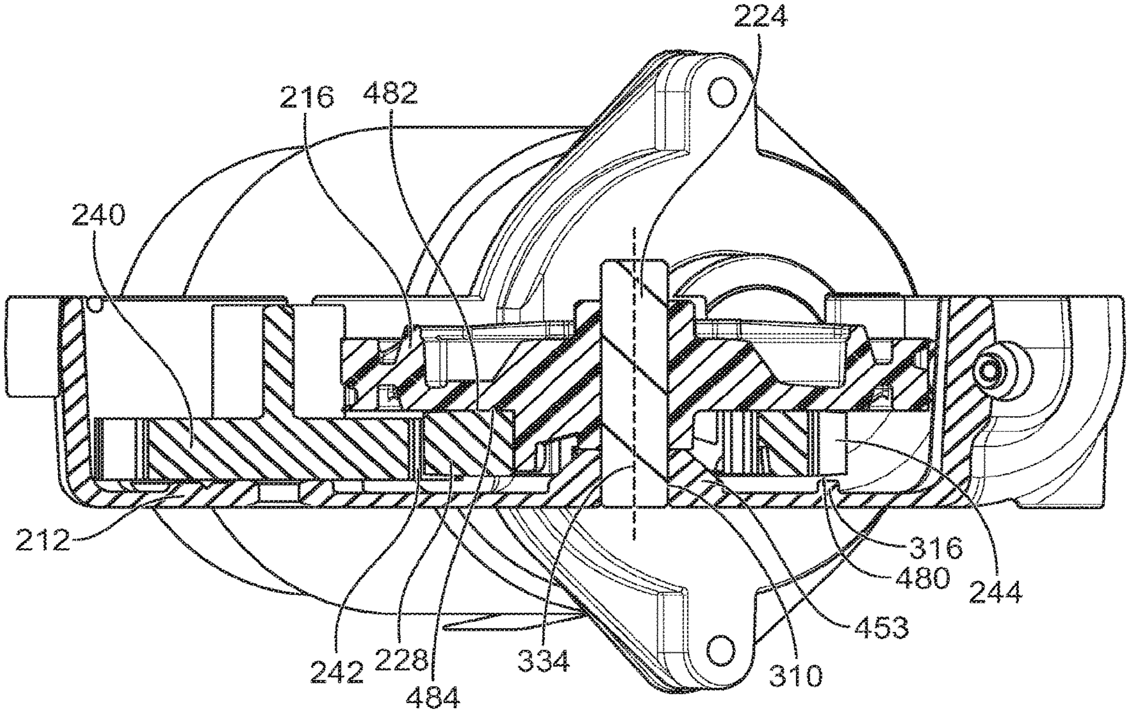
FIG. 31A is a cross-sectional view of the compound gear of FIG. 18 in the transmission housing with the primary spur gear of the compound gear in an unlocked position that permits the primary spur gear and secondary spur gear to rotate with rotation of the worm wheel.
Figure 31B:
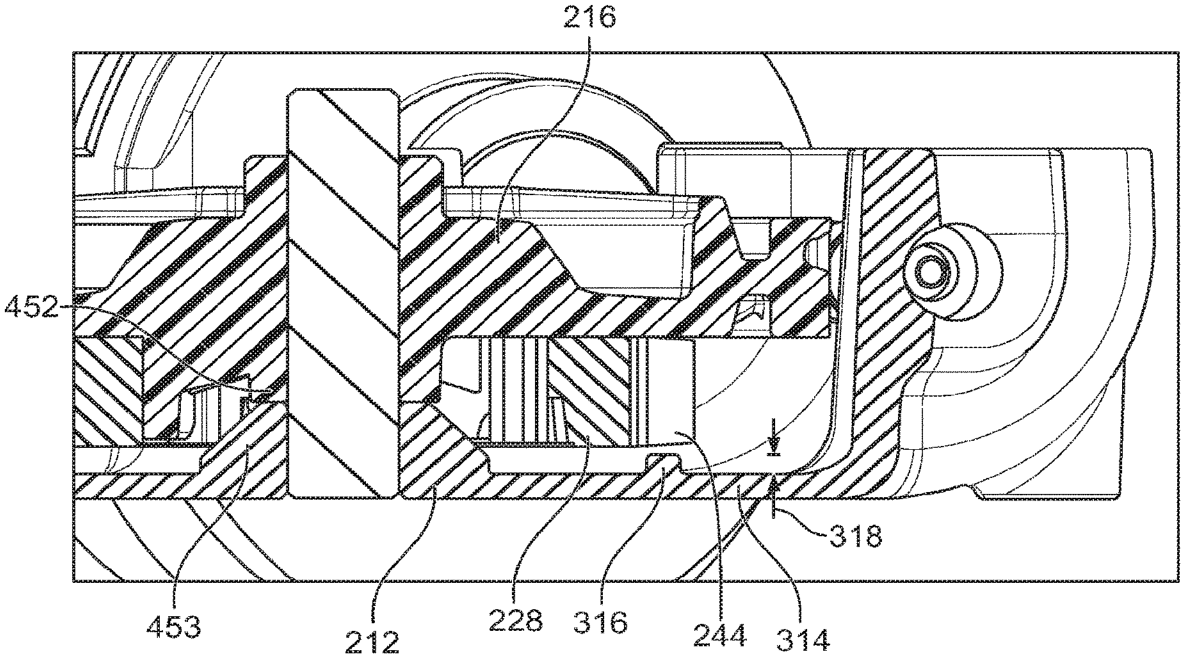
FIG. 31B is an enlarged portion of FIG. 31A showing a gap between the primary spur gear and the protrusion of the transmission housing.

With reference to FIGS. 31A and 31B, the worm wheel 216 and the spur gear 228 are shown with the lockable transmission 48 in the unlocked configuration. The teeth 244 of the spur gear 228 are separated from the protrusion 316 by a gap 480. The spur gear 228 may rotate without the teeth 244 contacting the protrusion 316. Further, the worm wheel 216 has a lower surface 482 contacting an upper surface 484 of the spur gear 228. The teeth 244 of the spur gear 228 are engaged with the teeth 242 of the spur gear 240. Thus, rotation of the worm wheel 216 causes turning of the spur gear 228 and turning of the spur gear 240.

Figure 32:
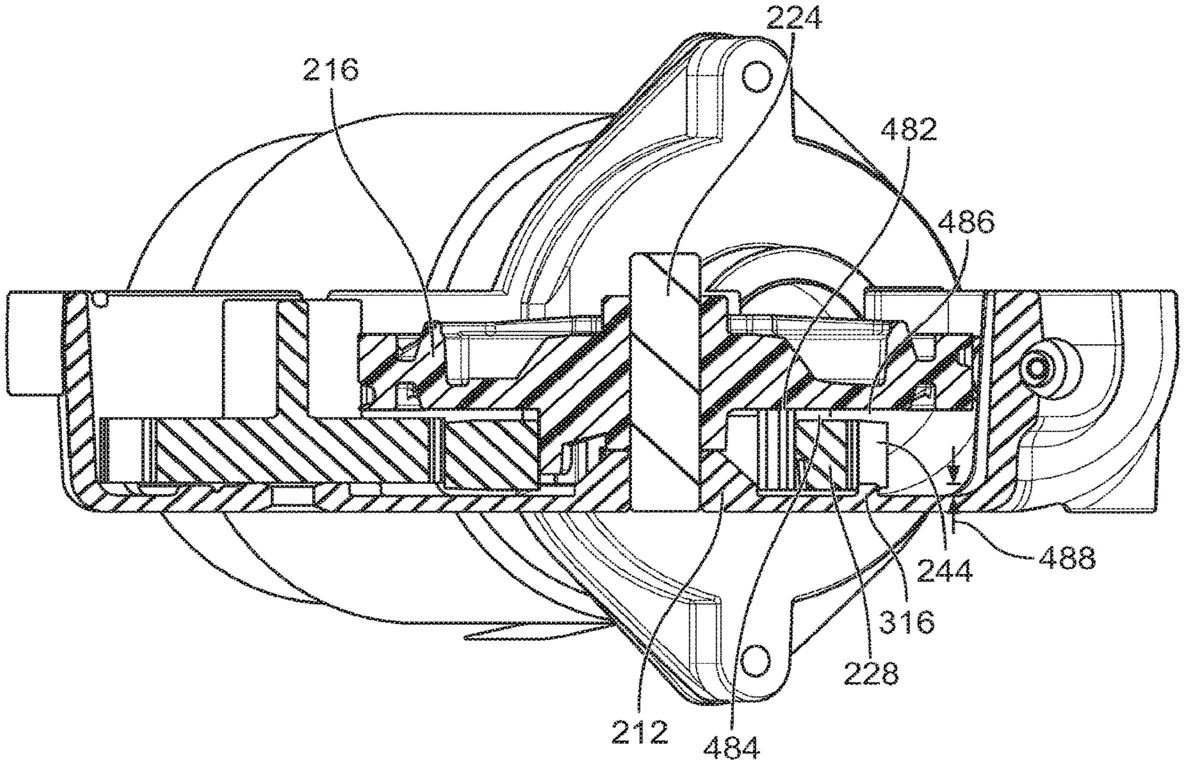
FIG. 32 is a cross-sectional view similar to FIG. 31A showing the primary spur gear in a locked position that fixes the primary spur gear relative to the transmission housing and inhibits rotation of the primary spur gear and the secondary spur gear.

With reference to FIG. 32, the lockable transmission 48 is shown in a locked configuration with the spur gear 228 having been shifted axially along the shaft 224 away from the worm wheel 216. As noted above, the lockable transmission 48 may shift from the unlocked configuration to the locked configuration in response to a sufficiently large torque being applied to the gear and pulley assembly 252 such as by the garage door 14 impacting an object such as, for example, a shelf mounted to the garage ceiling at full speed. When the lockable transmission 48 is in the locked configuration, a spacing 486 is introduced between the lower surface 482 of the worm wheel 216 and the upper surface 484 of the spur gear 228. Further, the protrusion 316 extends into a gap between two of the teeth 244 of the spur gear 228 and axially overlaps with the teeth 244 a distance 488. The teeth 244 will contact the protrusion 316 and inhibit turning of the spur gear 228 in either direction 490, 492 (see FIG. 17B). Due to the presence of the protrusion 316 between the teeth 244, the spur gear 228 cannot turn relative to the housing 212. Further, due to the engagement between the teeth 244 of the spur gear 228 and the teeth 242 of the spur gear 240, the spur gear 240 cannot turn relative to the housing 212 nor can the gear and pulley assembly 252. Because the gear and pulley assembly 252 is now fixed relative to the chassis 90, the gear and pulley assembly 252 resists movement of the belt or chain 26 and keeps the garage door 14 in position. The user (or a service person) may then remove the obstruction that caused the garage door 14 to stop suddenly, disengage the trolley 22 from the belt or chain 26, and safely lower the garage door 14. Once the garage door 14 has been lowered, the user or service person can fix the head unit 20 by replacing the compound gear 214.

Figure 33:
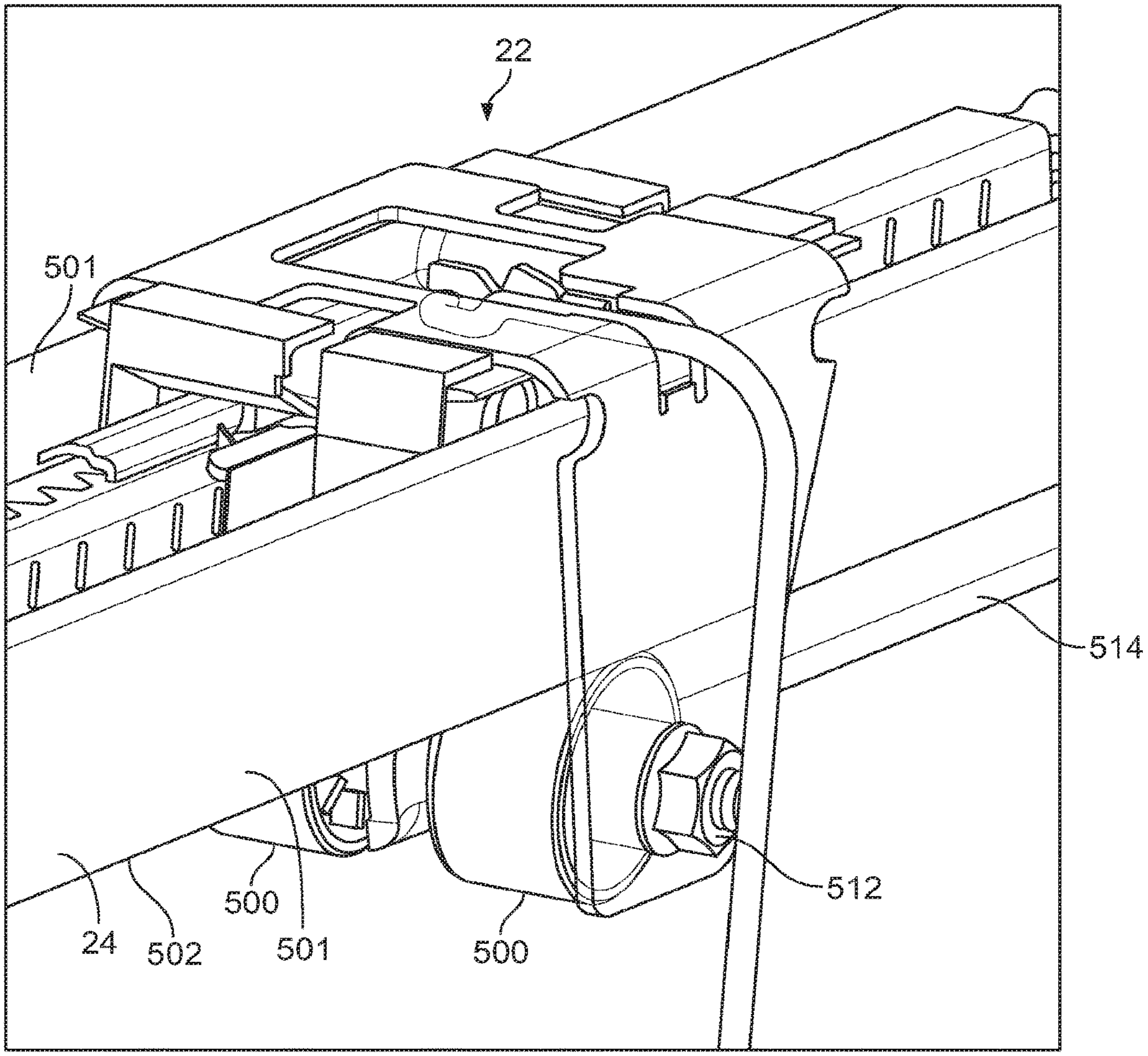
FIG. 33 is a perspective view of the trolley of the movable barrier operator system of FIG. 1.

With reference to FIG. 33, the rail 24 has a U-shaped cross section including a pair of spaced side walls 501 and a lower wall 502 connecting the side walls 501. The trolley 22 includes one or more wheels 500 that roll along the lower wall 502 as the trolley 22 travels along the rail 24. The trolley 22 also includes one or more rollers 503 (see FIGS. 35 and 36A) that roll along an inner, flat surface of the lower wall 502.

Figure 34:
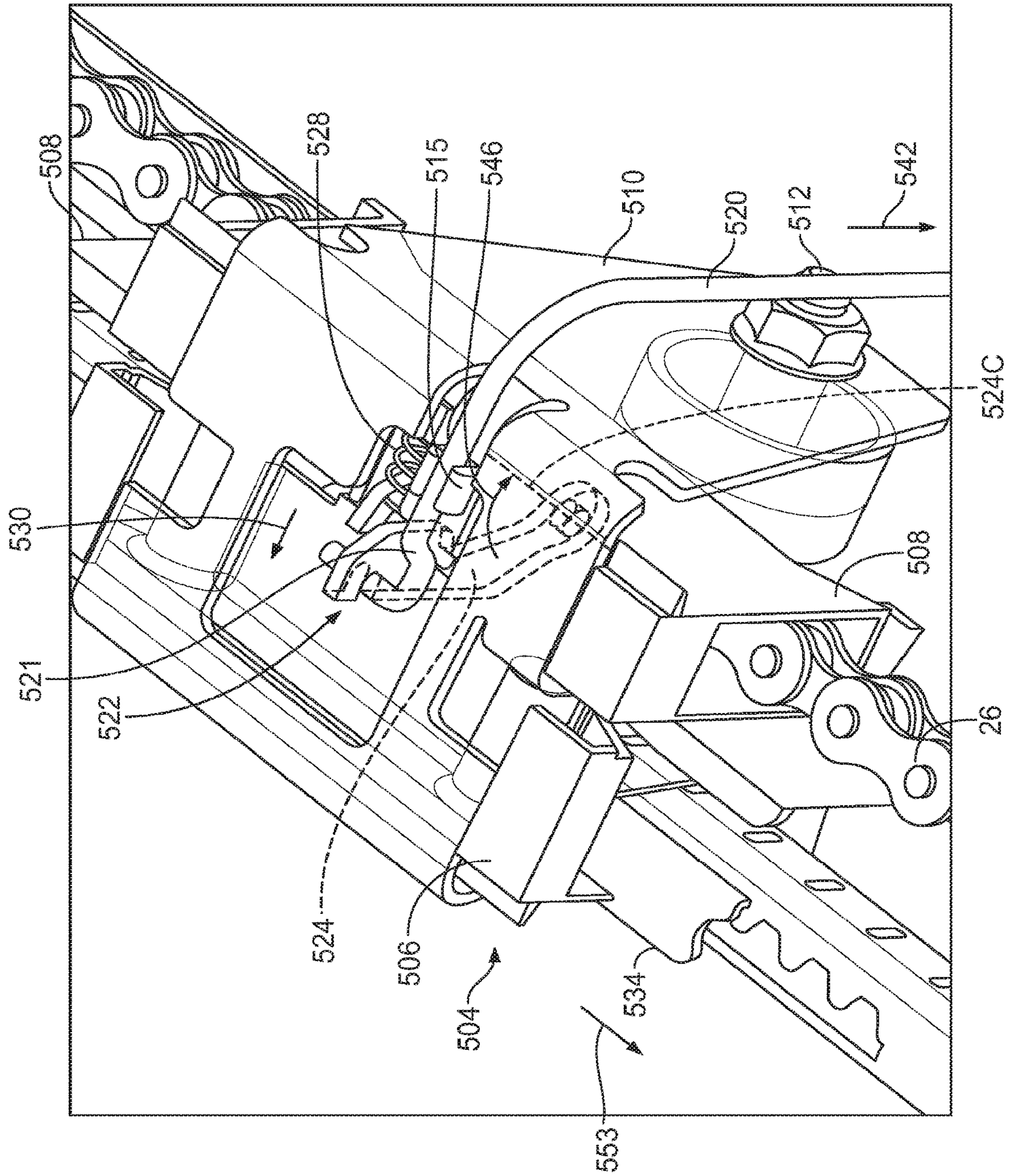
FIG. 34 is a perspective view of the trolley of FIG. 33 showing a release mechanism of the trolley.
Figure 35:
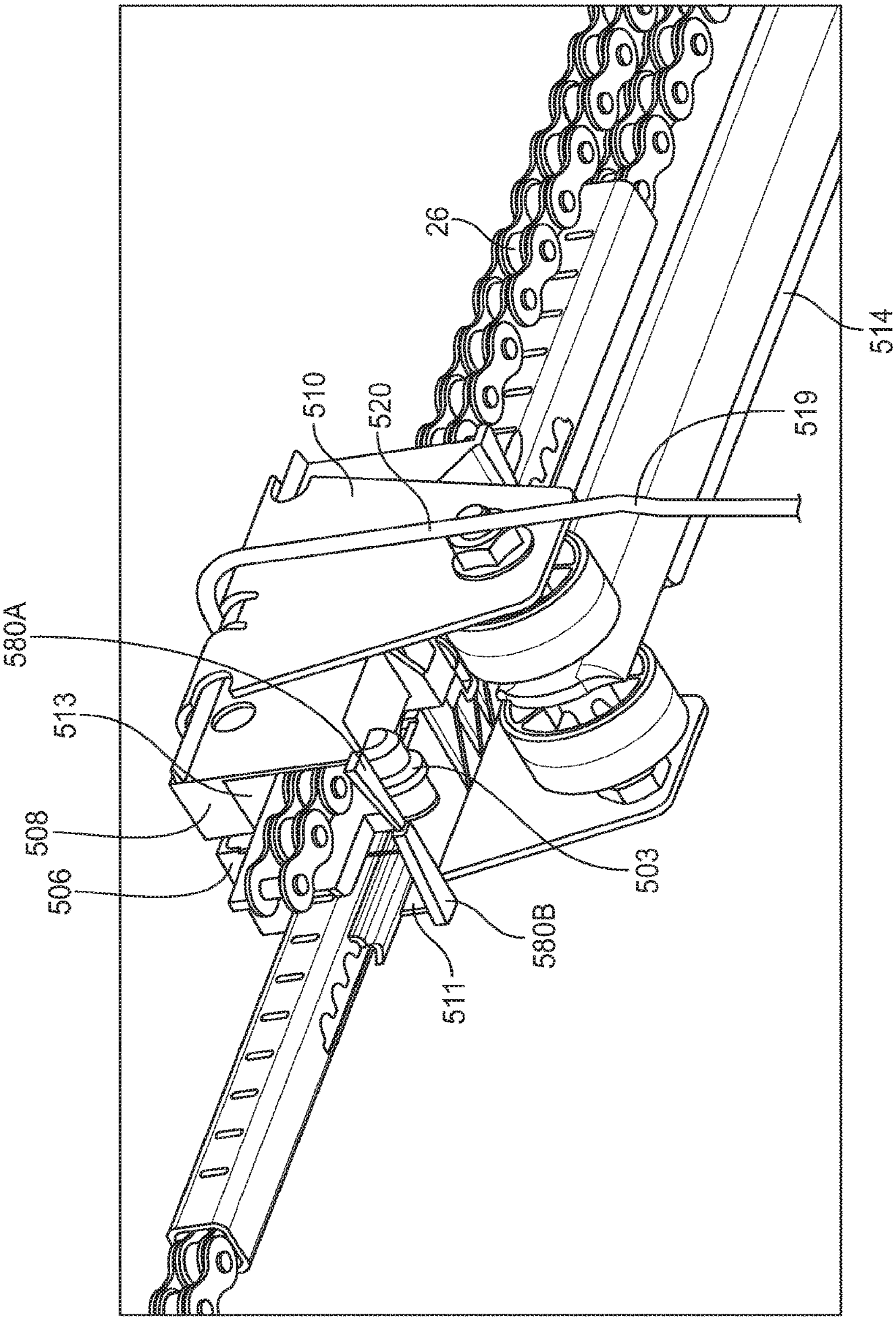
FIG. 35 is a perspective view of the trolley of FIG. 33 showing lower wheels of the trolley.

Regarding FIGS. 34 and 35, the trolley 22 includes a body 504 having two halves 506, 508 that form receiving portions, such as passageways 511, 513, for receiving different runs of the chain 26. The halves 506, 508 are secured to a bracket 510 that extends down around the rail 24 and connects the lower wheels 500 to the halves 506, 508. The bracket 510 includes openings on either side of the bracket 510 that receive a threaded rod or fastener such as a bolt 512 about which the wheels 500 may rotate. The bolt 512 also pivotally connects a J-arm 514 to the trolley 22. With reference to FIG. 1, the J-arm 514 connects the trolley 22 to the garage door 14.

Regarding FIGS. 34 and 35, the trolley release mechanism 25 (see FIG. 1) includes a flexible actuator, such as a pull-cord 520, having an end portion 521 connected to a hammer mechanism 522. Opposite the end portion 521, the pull-cord 520 includes a handle end portion 519 for gripping. In one embodiment, the handle end portion 519 includes an enlarged, rigid handle made of plastic. The hammer mechanism 522 includes a hammer 524 having a lower end portion, such as a connection portion 523, pivotally connected to the trolley half 508 via a pin 524A received in a slot 524B (see FIG. 36B) of the trolley half 508. The hammer 524 is pivotable as indicated by arrow 546 about a pivot axis 524C (see FIG. 34) that extends longitudinally such as parallel to the longitudinal length of the rail 24. The pull-cord end portion 521 may be connected to the hammer 524 by, for example, a knot, a fastener or an enlarged terminal end of the end portion 521 that limits movement of the pull-cord 520 through an opening of the hammer 524.

Figure 36A:
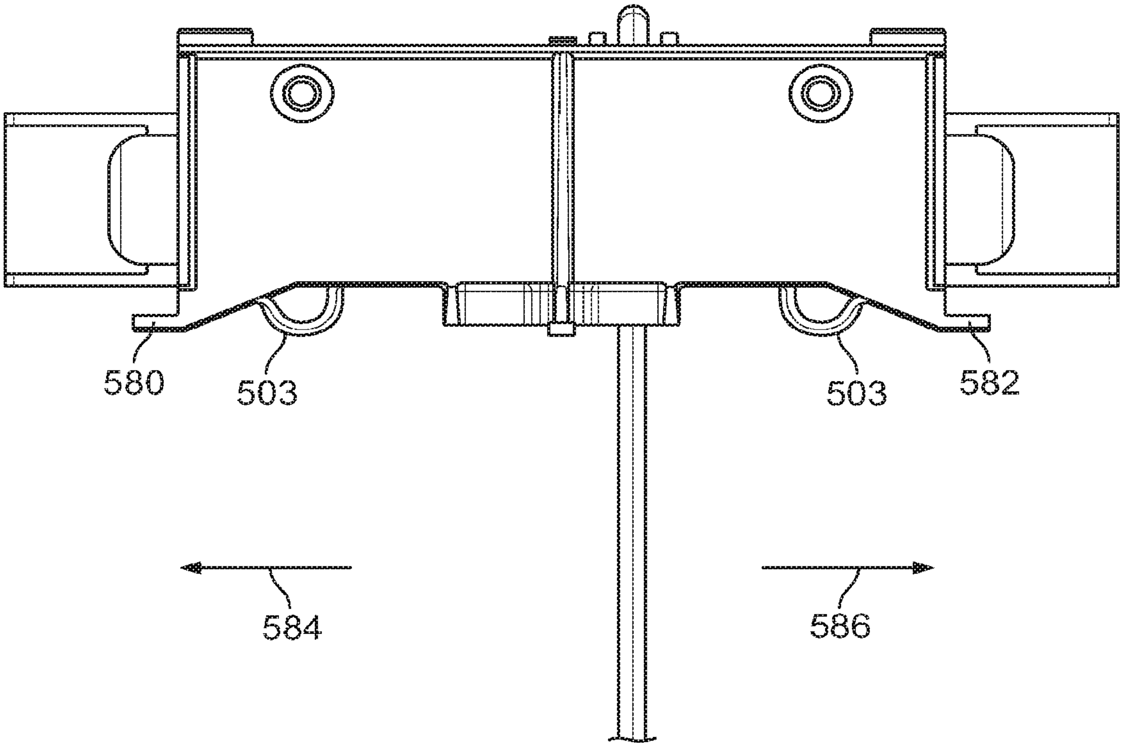
FIG. 36A is a side elevational view of a body of the trolley of FIG. 33 showing a lower pilot at each end of the trolley body for removing debris from the rail, and rollers of the trolley that travel along an inner surface of the rail.
Figure 36B:
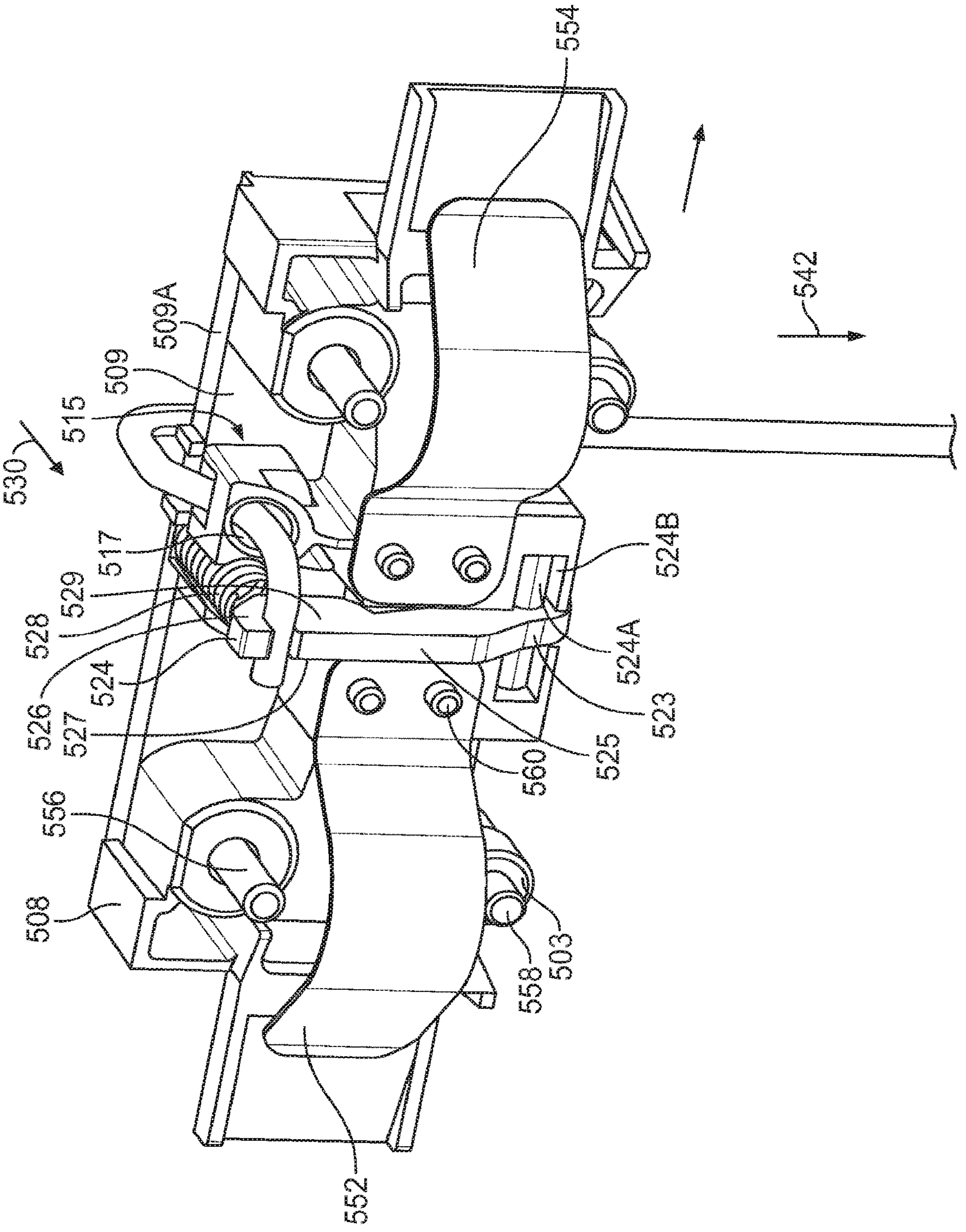
FIG. 36B is a perspective view of the trolley body of FIG. 36 with one half of the body removed to show components of the release mechanism and leaf springs for guiding a belt within the trolley body if a belt is used with the trolley instead of a chain.

Regarding FIG. 36B, the body half 508 of trolley 22 includes a wall 509 having an upper portion 509A and a guide 515 that directs the pull-cord 520 laterally away from the hammer 524 and up over the upper portion 509A of the wall 509. The guide 515 includes an opening 517 through which the pull-cord 520 extends. The hammer 524 includes side surfaces 527, 529 and the pull-cord 520 extends along one of the side surfaces 527, 529 toward the guide 515.

The hammer mechanism 522 further includes a spring 528 that urges an upper portion, such as an attachment portion 526, of the hammer 524 in direction 530 and causes an engagement member 525 of the hammer 524 to engage a groove of a trolley connector 534. The trolley connector 534 secures the ends of the belt or chain 26 together and permits adjustment of the spacing between the ends of the belt or chain 26 to adjust the tension in the belt or chain 26. When the hammer 524 is engaged with the trolley connector 534, movement of the belt or chain 26 causes movement of the trolley 22 and garage door 14 connected thereto. In one embodiment, the hammer 524 is made of steel and trolley connector 534 is made of a rigid plastic.

With reference to FIG. 34, to release the trolley 22 from the belt or chain 26, the user pulls the pull-cord 520 downward in direction 542. A portion of the pull-cord 520 shifts through the guide 515, up and over the upper portion 509A of the wall 509, and downward. Pulling the pull-cord 520 in direction 542 pivots the hammer 524 in direction 546. This overcomes the bias provided by the spring 528 and withdraws the engagement member 525 of the hammer 524 from the groove of the trolley connector 534. However, if an intruder attempts to pull the pull-cord 508 in generally longitudinally in direction 553 using a coat hanger, the pull-cord 520 will be applying a force on the hammer 524 that is generally parallel to the pivot axis 524C of the hammer 524. Most of the force the intruder applies to the pull-cord 520 will be transferred to the guide 515 and/or the upper portion 509A of the wall 509. This makes it difficult for the intruder to overcome the spring 528 and move the hammer 524 toward a release position.

Regarding FIG. 36B, the trolley 22 is shown with components removed including the half 506. The trolley 22 includes pins 556 for connecting upper ends of the halves 506, 508 and pins 558 for connecting lower ends of the halves 506, 508 and capturing the rollers 503 between the halves 506, 508. If a belt is utilized with the trolley 22 instead of the chain 26, the trolley 22 includes leaf springs 552, 554 that are arranged to urge the belt toward one side of the passageway 511. The trolley 22 includes pins 560 sized to extend through openings of the leaf springs 552, 554 and capture the leaf springs 552, 554 between the halves 506, 508.

With reference to FIG. 36A, the trolley body 504 includes pilots 580, 582 configured to push debris inside of the rail 24 out of the way of the rollers 503. More specifically, when the trolley 22 moves in direction 584, the pilot 580 pushes debris to the end of the travel of the trolley 22 within the rail 24. When the trolley 22 moves in direction 586, the pilot 582 pushes debris to the opposite end of the travel of the trolley 22 within the rail 24. Each pilot 580, 582 may be formed by pilot portions 580A, 580B (see FIG. 35) of the halves 506, 508. In one embodiment, each pilot 580, 582 includes a V-shaped leading edge for collecting debris as the trolley 22 moves within the rail 24.

The head unit 20 and the rail 24 may be configured differently depending on the intended installer. With reference to FIG. 13, for installation by a homeowner, the head unit 20 may include the rail section 258 mounted to the chassis 90 and the gear and pulley assembly 252 connected to the spur gear 240. The rail 24 may be provided in sections that the homeowner assembles and connects to the rail section 258 during installation of the movable barrier operator system 10.

Figure 37:
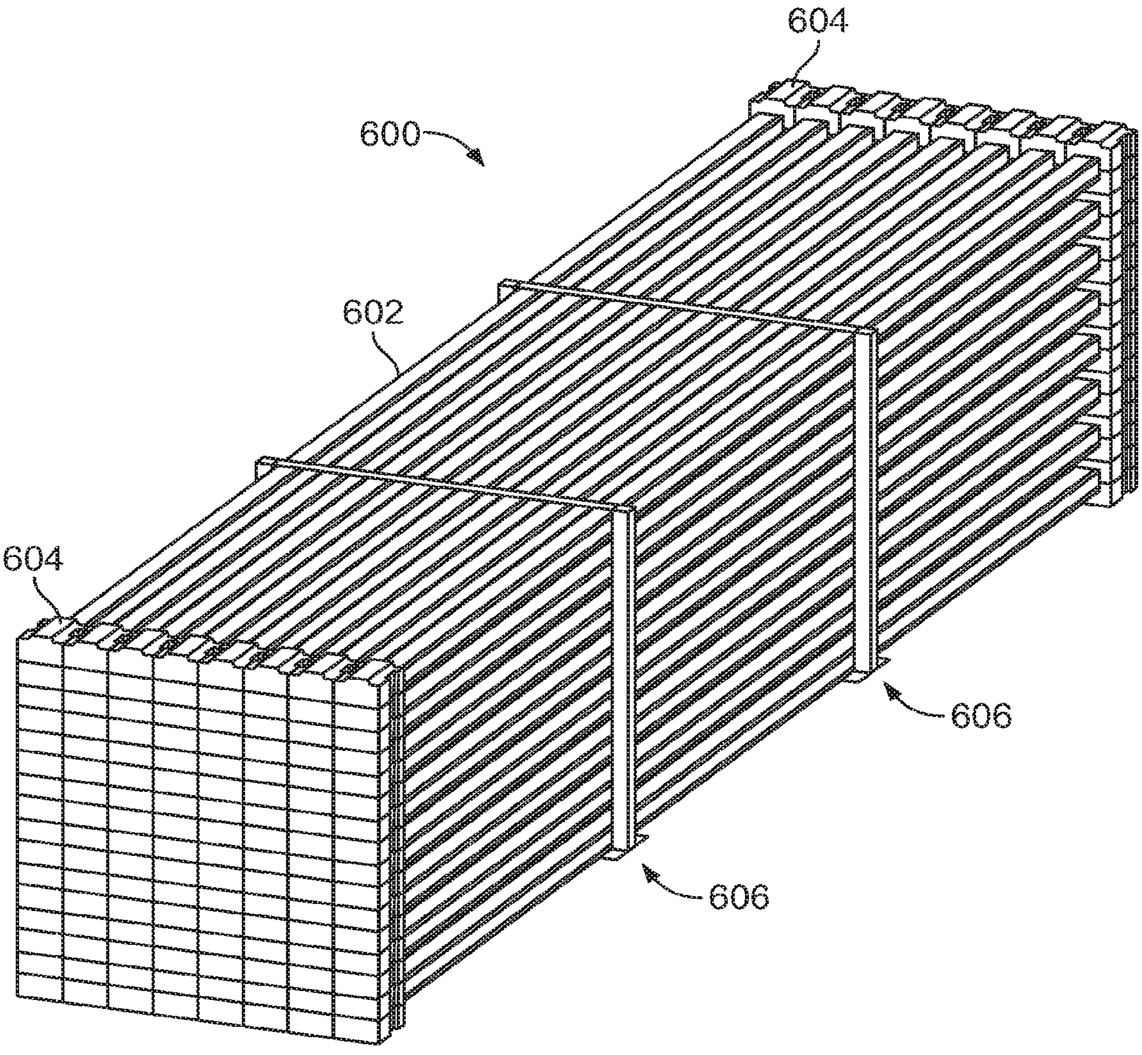
FIG. 37 is a perspective view of an assembly of rails for movable barrier operators, each rail having end caps at the ends of the rail to protect the rail and assist in stacking of the rails.

With reference to FIG. 37, a one-piece rail assembly 602 may be connected to the head unit 20 when the movable barrier operator system 10 is installed or intended for installation by a professional, experienced installer. Each rail assembly 602 includes the rail 24 along which the trolley 22 travels, drive and idler pulleys/gears (depending on whether a belt or chain is to be used), and hardware. In some instances, the rail assembly 602 may include the trolley 22 and chain or belt pre-installed on the rail 24, however in other instances the trolley 22 and chain or belt may be separate from the rail 24 but included in or otherwise packaged with the rail assembly 602. The hardware included in a rail assembly 602 may be used by the installer for mounting the rail assembly 602 within a garage 12, connecting the rail 24 to garage header and to the head unit 20, and connecting the trolley 22 to the garage door 14 (e.g., via J-hook 514).

FIG. 37 illustrates a bundle, a collection, or a plurality 600 of rail assemblies 602. The plurality 600 is configured for transport, such as from a manufacturer to a distributor. The plurality, bundle or collection 600 includes: a plurality of rail assemblies 602, wherein each rail assembly is constituted by a pair of caps 604 with each cap 604 configured at opposite ends of each rail assembly 602; and one or more rail bridges 606 that help maintain the plurality of rail assemblies 602 in a bundled configuration. The assembly 600 may also include one or more elongated members such as straps, chains, or bands which are secured about the caps 604 and/or the rail bridges 602 to maintain the rail assemblies 602 in the bundled configuration. Furthermore the collection 600 of rail assemblies 602 (or each rail assembly 602) may include a cover such as a plastic wrap or film to protect the rails 24 or other contents during transportation and/or storage from intrusion by foreign objects such as fine particulate matter, liquids, insects, etc.

Figure 38:
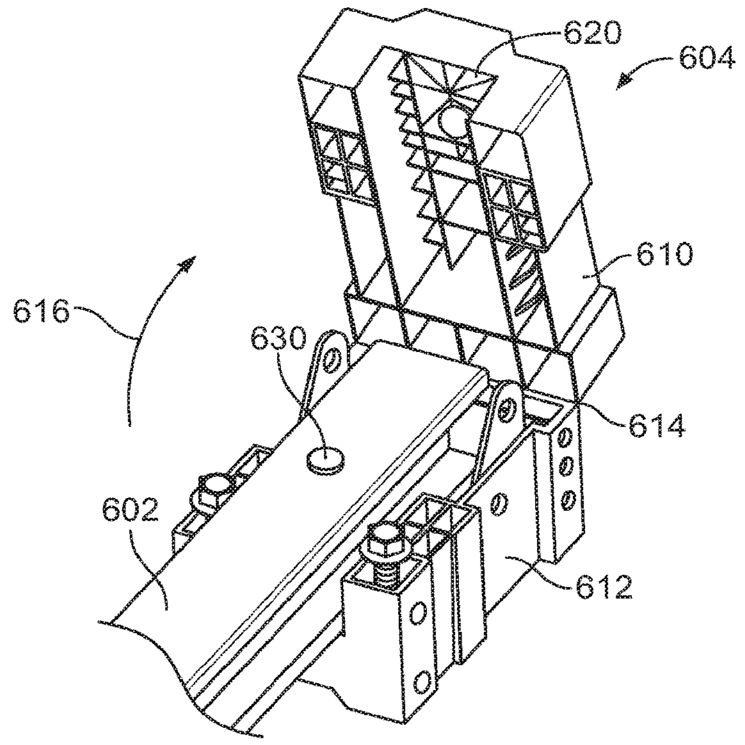
FIG. 38 is a perspective view of one of the rail end caps of FIG. 37 with the end cap opened to show the rail and mounting hardware for the rail.

Regarding FIG. 38, the caps 604 protect the ends of the rail 24 and the drive and idler pulleys/sprockets therein. Each cap 604 includes an upper portion 610, a lower portion 612, and a hinge portion 614 connecting the upper and lower portions 610, 612. In other configurations the upper portion 610 and the lower portion 612 of the caps 602 are separate without hinge portion 614. The upper portion 610 may be connected to the lower portion 612 by means of, for example, fasteners, a snap-fit engagement, or one or more frangible portions. To open the cap 604, the snap-fit engagement is released, or the frangible portion is broken, and the upper portion 612 is pivoted upwardly in direction 616 to open the cap 604. In another embodiment, the upper portion 610 and lower portion 612 are separate components and are secured together about the rail assembly 602 using a plastic band and/or fasteners such as bolts, threaded rods or screws. The caps 604 may be made from, for example, a durable, high-impact, recyclable plastic material.

Figure 39:
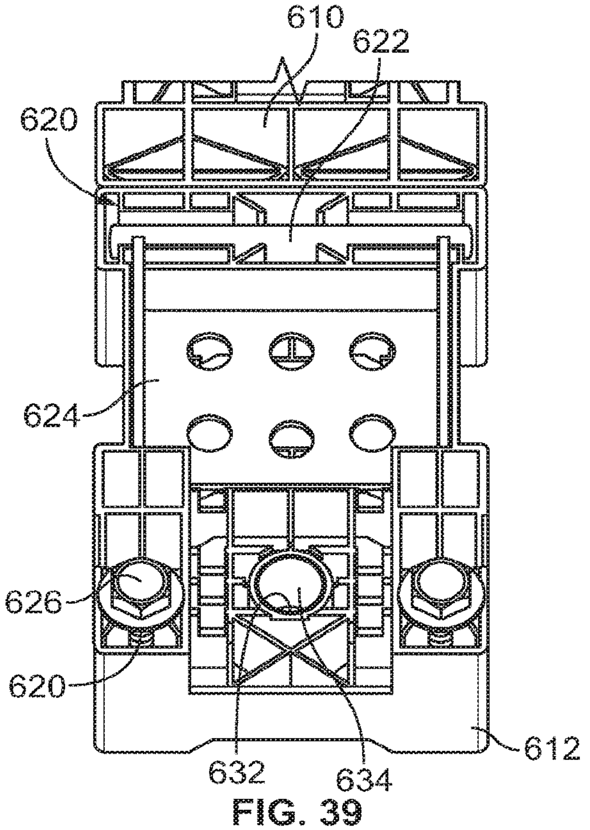
FIG. 39 is a perspective view of a lower portion of the cap of FIG. 38 with the rail removed to show fasteners and a header bracket for the rail that are contained in the cap lower portion.
Figure 40:
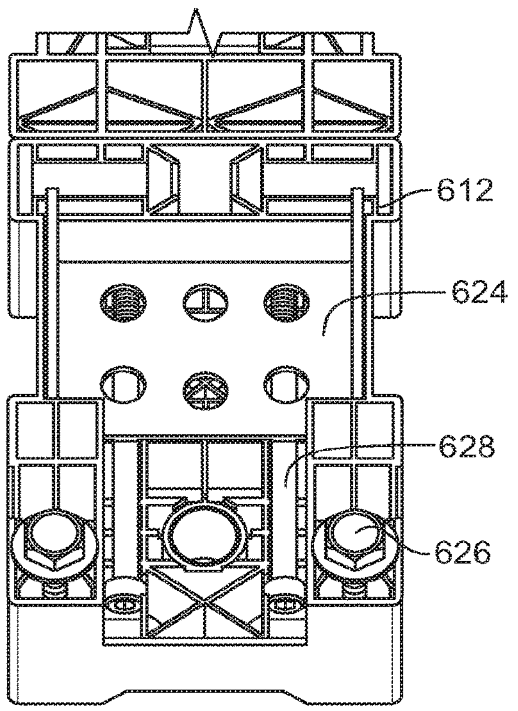
FIG. 40 is a view similar to FIG. 39 of another configuration of mounting hardware in the lower portion.

With reference to FIGS. 38 and 39, the upper and lower portions 610, 612 include one or more compartments 620 that may be configured to receive the end of the rail 24 and/or hardware for mounting the rail 24 of the rail assembly 602. In one embodiment, the one or more compartments 620 include separate compartments 620 for receiving a clevis pin 622, a header bracket 624, and bolts 626. The rail 24 may include a shaft 630 to which a drive sprocket/pulley is mounted. The shaft 630 may include splines that engage recesses of a socket of the spur gear 240. The cap lower portion 612 may include a through opening 632 and an annular wall 634 extending thereabout. When the rail 24 is positioned in the cap lower portion 612, a portion of the shaft 630 may extend into the through opening 632. The annular wall 634 extends around and protects the shaft 630. In FIG. 40, an alternative embodiment is provided which includes bolts 628 for mounting the header bracket 624 or for attaching the rail 24 to the head unit 20.

In some embodiments, the caps 604 may each include indicia regarding returning the caps to the manufacturer or seller of the rails 24 and/or of the head units 20 for recycling or reuse. The indicia may be printed on or molded into the upper and lower portions 610, 612 of the caps 604. In an embodiment, for each cap 604 (or pair of caps 604) returned by the installer to the manufacturer/seller, a discount or a credit may be offered to the installer for the purchase of additional product(s) including, but not limited to, rails 24, head units 20, and remote controls such as radio transmitters 40. In this manner, certain installers of movable barrier operator systems who facilitate cap reuse or recycling can enjoy additional profit due to higher margins as compared to other installers who choose to dispose of the caps 604 rather than participating in environmental reuse/recycling of the caps 604. Accordingly, professional installers of movable barrier operator systems are encouraged or incentivized to recycle the caps 604.

Figure 41:
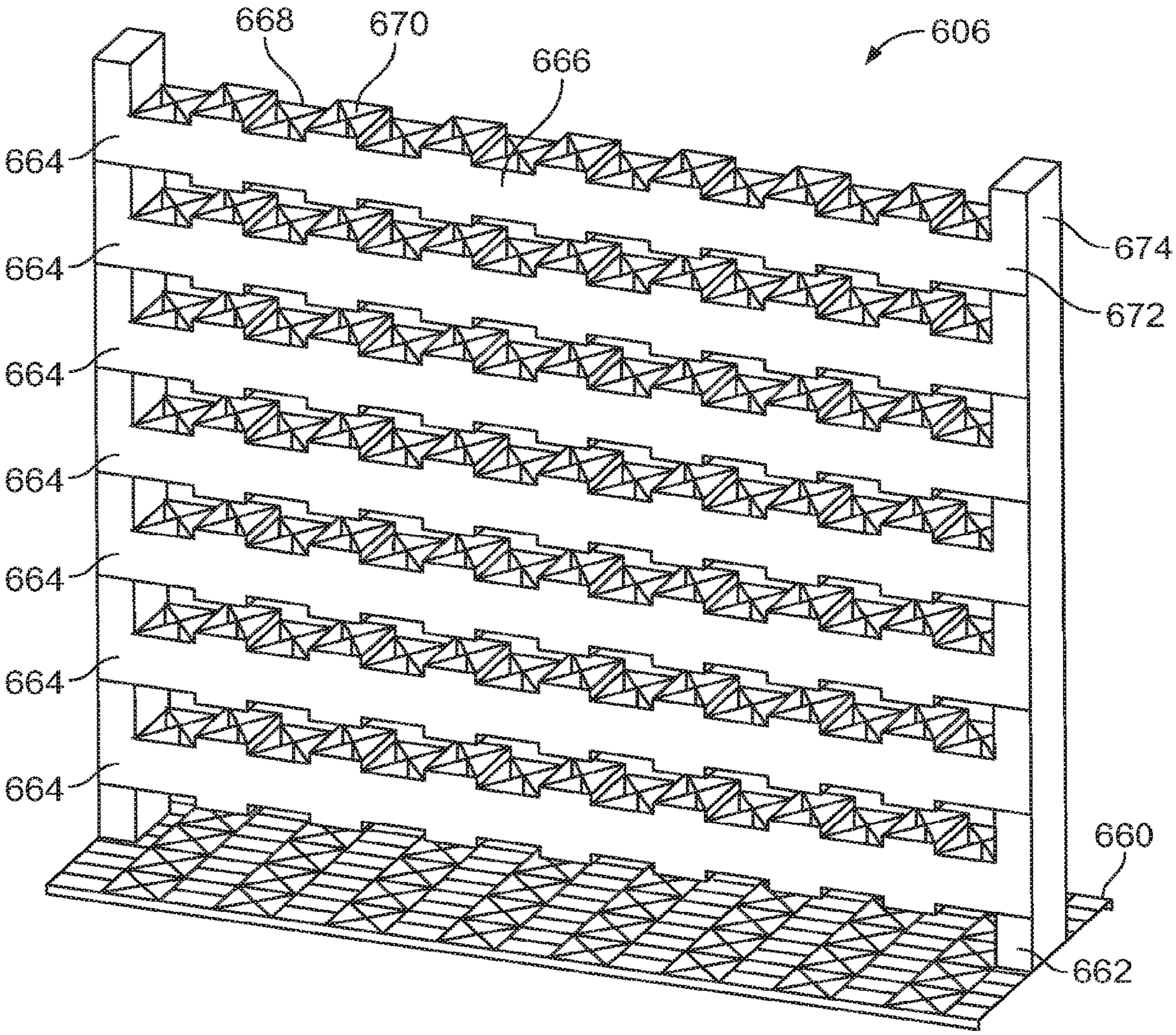
FIG. 41 is a rail bridge of the assembly of rails of FIG. 37 that supports and separates the rails.

Regarding FIG. 41, each rail bridge 606 includes a base 660 and legs 662 that receive a support 664. The rail bridge 606 includes one or more supports 664 stacked on top of each other that support the rail assemblies 602. Each support 664 includes a horizontal member 666 having recesses 668 and walls 670 separating the recesses 668. The rail 24 of each rail assembly 602 fits into one of the recesses 668 and the walls 670 separate the rail from nearby rails and inhibits lateral movement of each of the rail assemblies 602. Each support 664 includes a lower portion 672 that engages an upper portion 674 of the nearby support 664. In one example, the upper portion 674 includes a recess and the lower portion 672 includes a projection that fits into the recess of the upper portion 674 and forms an engagement therebetween.

Figure 42:
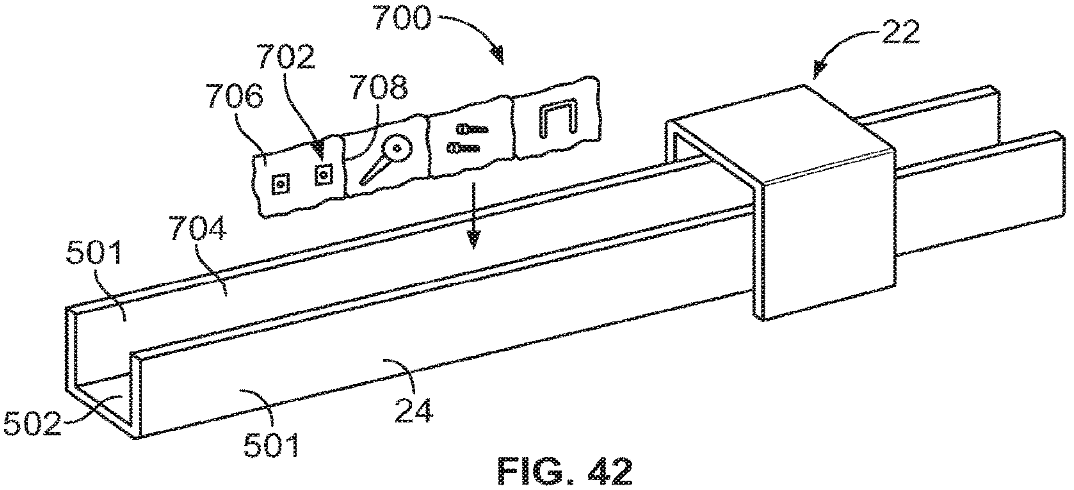
FIG. 42 is a schematic view of a container for movable barrier operator hardware that may be received in the rail of FIG. 33.

Turning to FIG. 42, in one embodiment the movable barrier operator system 10 may be provided with a container 700 containing hardware 702 for installation such as nuts, bolts, brackets, and pins. As shown, the rail 24 has a generally square U-shaped cross sectional shape, and the container 700 may be positioned in a recess 704 of the rail 24 during transport. During installation, the installer removes the container 700 from the rail 24 and removes the hardware 702 as needed. In one embodiment, the container 700 is a plastic bag or tube having sections or pockets 706 separated by heat seals 708. The pockets 706 may be labeled and/or arranged to assist the installer. For example, the pockets 706 may be arranged, configured or marked with indicia (e.g., drawings and/or human-readable text) so that the installer sequentially opens the pockets 706 in a particular order so that the hardware 702 becomes accessible in a predetermined order that corresponds to installation instructions provided with the movable barrier operator system 10.

While there have been illustrated and described particular embodiments of the present invention, it will be appreciated that numerous changes and modifications will occur to those skilled in the art, and it is intended for the present invention to cover all those changes and modifications which fall within the scope of the appended claims.

What is claimed is:

1. A movable barrier operator comprising:

a body;

a motor supported by the body and including a rotatable shaft;

a rotatable drive supported by the body and configured to be connected to an elongate driven member; and a lockable transmission connecting the motor to the rotatable drive, the lockable transmission having: an unlocked configuration that permits the rotatable drive to rotate relative to the body to drive the driven member; and a locked configuration that secures the rotatable drive to the body and fixes the rotatable drive against rotation relative to the body, the lockable transmission configured to shift from the unlocked configuration to the locked configuration in response to a torque applied to the rotatable drive exceeding a predetermined threshold.

2. The movable barrier operator of claim 1 wherein the lockable transmission includes a rotatable transmission component operable to transmit rotation of the rotatable shaft to rotation of the rotatable drive with the lockable transmission in the unlocked configuration.

3. The movable barrier operator of claim 2 wherein the lockable transmission includes a housing and the rotatable transmission component includes a locking portion spaced from the housing with the lockable transmission in the unlocked configuration and engaged with the housing with the lockable transmission in the locked configuration.

4. The movable barrier operator of claim 1 wherein the lockable transmission includes a housing, a first gear, and a second gear, the first and second gears mounted on a common shaft, the first gear operably coupled to the rotatable shaft of the motor, and the second gear operably coupled to the rotatable drive, wherein one of the first and second gears is spaced from the housing with the lockable transmission in the unlocked configuration and the one of the first and second gears is engaged with the housing with the lockable transmission in the locked configuration.

5. The movable barrier operator of claim 1 wherein the lockable transmission includes:

a first gear operably coupled to the rotatable shaft of the motor;

a second gear operably coupled to the rotatable drive; and one or more of the first gear and the second gear includes separating portions configured to shift the first gear and second gear apart with turning of the first and second gears relative to each other.

6. The movable barrier operator of claim 1 wherein the rotatable shaft includes a worm, and the lockable transmission includes a first spur gear associated with the rotatable drive and a compound gear including a worm wheel engaged with the worm and a second spur gear engaged with the first spur gear.

7. The movable barrier operator of claim 1 wherein the lockable transmission includes a housing, the housing having a wall with a protrusion, and the lockable transmission includes a rotatable component that engages the protrusion to fix the rotatable drive against rotation relative to the body with the lockable transmission in the locked configuration.

8. A lockable transmission for a movable barrier operator, the lockable transmission having an unlocked configuration that permits a rotatable drive of the movable barrier operator to rotate relative to a body of the movable barrier operator to drive a driven member of the movable barrier operator, and a locked configuration that secures the rotatable drive to the body and fixes the rotatable drive against rotation relative to the body, wherein the lockable transmission is configured to shift from the unlocked configuration to the locked configuration in response to a torque applied to the rotatable drive exceeding a predetermined threshold.

9. The lockable transmission of claim 8, wherein the lockable transmission comprises a rotatable transmission component operable to transmit rotation of a rotatable shaft of a motor to rotation of the rotatable drive when the lockable transmission in the unlocked configuration.

10. The lockable transmission of claim 9, wherein the lockable transmission comprises a housing and the rotatable transmission component comprises a locking portion spaced from the housing with the lockable transmission in the unlocked configuration and engaged with the housing with the lockable transmission in the locked configuration.

11. The lockable transmission of claim 8, wherein the lockable transmission comprises:

a housing;

a first gear; and a second gear, wherein the first and second gears are mounted on a common shaft, wherein the first gear is configured to be operably coupled to a rotatable shaft of a motor of the movable barrier operator, wherein the second gear is operably coupled to the rotatable drive, wherein one of the first and second gears is spaced from the housing with the lockable transmission in the unlocked configuration and the one of the first and second gears is engaged with the housing with the lockable transmission in the locked configuration.

12. The lockable transmission of claim 8, wherein the lockable transmission comprises:

a first gear operably coupled to a motor drive shaft;

a second gear operably coupled to the rotatable drive; and one or more of the first gear and the second gear includes separating portions configured to shift the first gear and second gear apart with turning of the first and second gears relative to each other.

13. The lockable transmission of claim 8, wherein a rotatable shaft of a motor of the movable barrier operator includes a worm, and the lockable transmission includes a first spur gear associated with the rotatable shaft and a compound gear including a worm wheel engaged with the worm and a second spur gear engaged with the first spur gear.

14. The lockable transmission of claim 8, wherein the lockable transmission includes a housing, the housing having a wall with a protrusion, and the lockable transmission includes a rotatable component that engages the protrusion to fix the rotatable drive against rotation relative to the body with the lockable transmission in the locked configuration.

* * * * *